(12) United States Patent
Bisang et al.

(10) Patent No.: US 10,920,853 B2
(45) Date of Patent: Feb. 16, 2021

(54) ELASTIC ELEMENT FOR SECURING A JUMP MAT TO A TRAMPOLINE FRAME

(71) Applicant: Angehrn AG Umformtechnik, Degersheim (CH)

(72) Inventors: Erwin Bisang, Huenenberg (CH); Ludwig Durrer-Kuettel, Immensee (CH); Christian Mehr, Kirchberg (CH)

(73) Assignee: Angehrn AG Umformtechnik, Degersheim (CH)

( * ) Notice: Subject to any disclaimer, the term of this patent is extended or adjusted under 35 U.S.C. 154(b) by 35 days.

(21) Appl. No.: 16/098,371

(22) PCT Filed: May 2, 2017

(86) PCT No.: PCT/EP2017/060439
§ 371 (c)(1),
(2) Date: Nov. 1, 2018

(87) PCT Pub. No.: WO2017/191144
PCT Pub. Date: Nov. 9, 2017

(65) Prior Publication Data
US 2019/0120325 A1   Apr. 25, 2019

(30) Foreign Application Priority Data
May 2, 2016   (EP) ..................................... 16167861

(51) Int. Cl.
*A63B 5/11*       (2006.01)
*A63B 21/055*    (2006.01)
*F16G 11/14*     (2006.01)

(52) U.S. Cl.
CPC ................ *F16G 11/14* (2013.01); *A63B 5/11* (2013.01); *A63B 21/0555* (2013.01); *A63B 21/0552* (2013.01)

(58) Field of Classification Search
CPC ............ A63B 21/0552; A63B 21/0555; A63B 21/0557; A63B 71/0054; A63B 5/11;
(Continued)

(56) References Cited

U.S. PATENT DOCUMENTS 2,916,746 A   12/1959   Pease
3,528,656 A    9/1970   Haanen
(Continued)

FOREIGN PATENT DOCUMENTS

DE           102 26 707 A1    1/2004
DE     20 2015 102 576 U1    6/2015
(Continued)

OTHER PUBLICATIONS

Written Opinion of the International Searching Authority of International Application No. PCT/EP2017/060439 dated Jul. 21, 2017 and English Translation, 13 pages.
(Continued)

*Primary Examiner* — Garrett K Atkinson
*Assistant Examiner* — Zachary T Moore
(74) *Attorney, Agent, or Firm* — Fay Sharpe LLP

(57) ABSTRACT

An elastic element for securing a jump mat to a trampoline frame includes a terminating element which is provided at each free end and alters the diameter of the elastic element. The elastic element includes a flexible cord element and two separate terminating elements that are connected to the flexible cord element at the free ends in a clamping fit, the terminating element being held in a connector connected to the jump mat, in a form fit and/or a clamping fit.

2 Claims, 30 Drawing Sheets

(58) Field of Classification Search
CPC ........ F16B 5/06; F16B 5/0685; F16B 5/0692; F16B 45/00; F16B 45/04; F16B 45/06; F16G 11/14
See application file for complete search history.

(56) References Cited

U.S. PATENT DOCUMENTS

| | | |
|---|---|---|
| 8,821,358 B1 | 9/2014 | Werner |
| 9,289,637 B2 * | 3/2016 | Publicover ............... A63B 5/11 |
| 2010/0319169 A1 | 12/2010 | Lin |
| 2013/0316876 A1 * | 11/2013 | Publicover ............... A63B 5/11 |
| | | 482/27 |
| 2016/0296782 A1 * | 10/2016 | Dai .................... A63B 21/0557 |

FOREIGN PATENT DOCUMENTS

| | | |
|---|---|---|
| EP | 2 540 352 A1 | 1/2013 |
| WO | WO 2011/032173 A2 | 3/2011 |
| WO | WO 2015/112956 A1 | 7/2015 |

OTHER PUBLICATIONS

International Search Report of International Application No. PCT/EP2017/060439 dated Jul. 21, 2017, 6 pages.

* cited by examiner

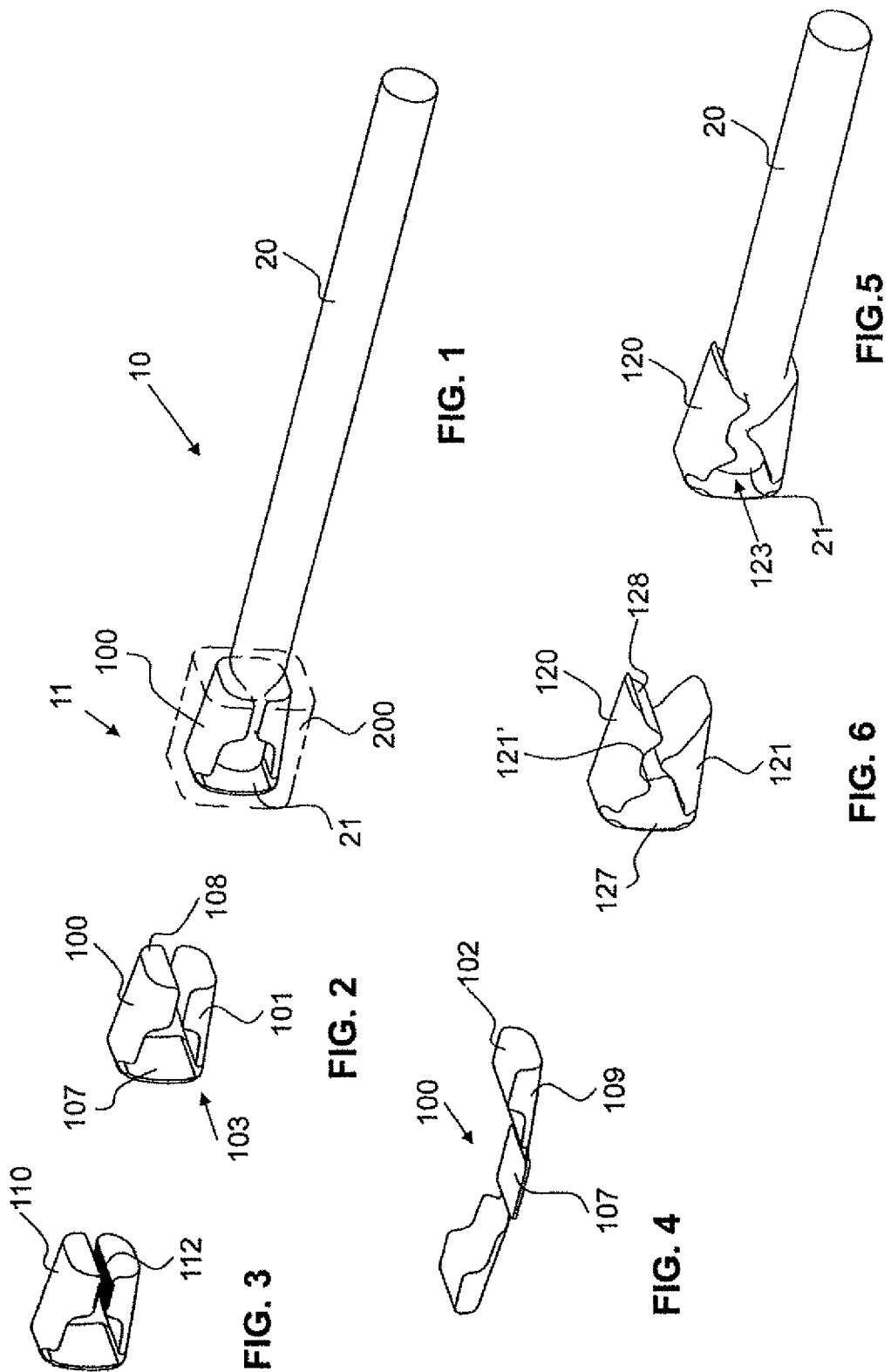

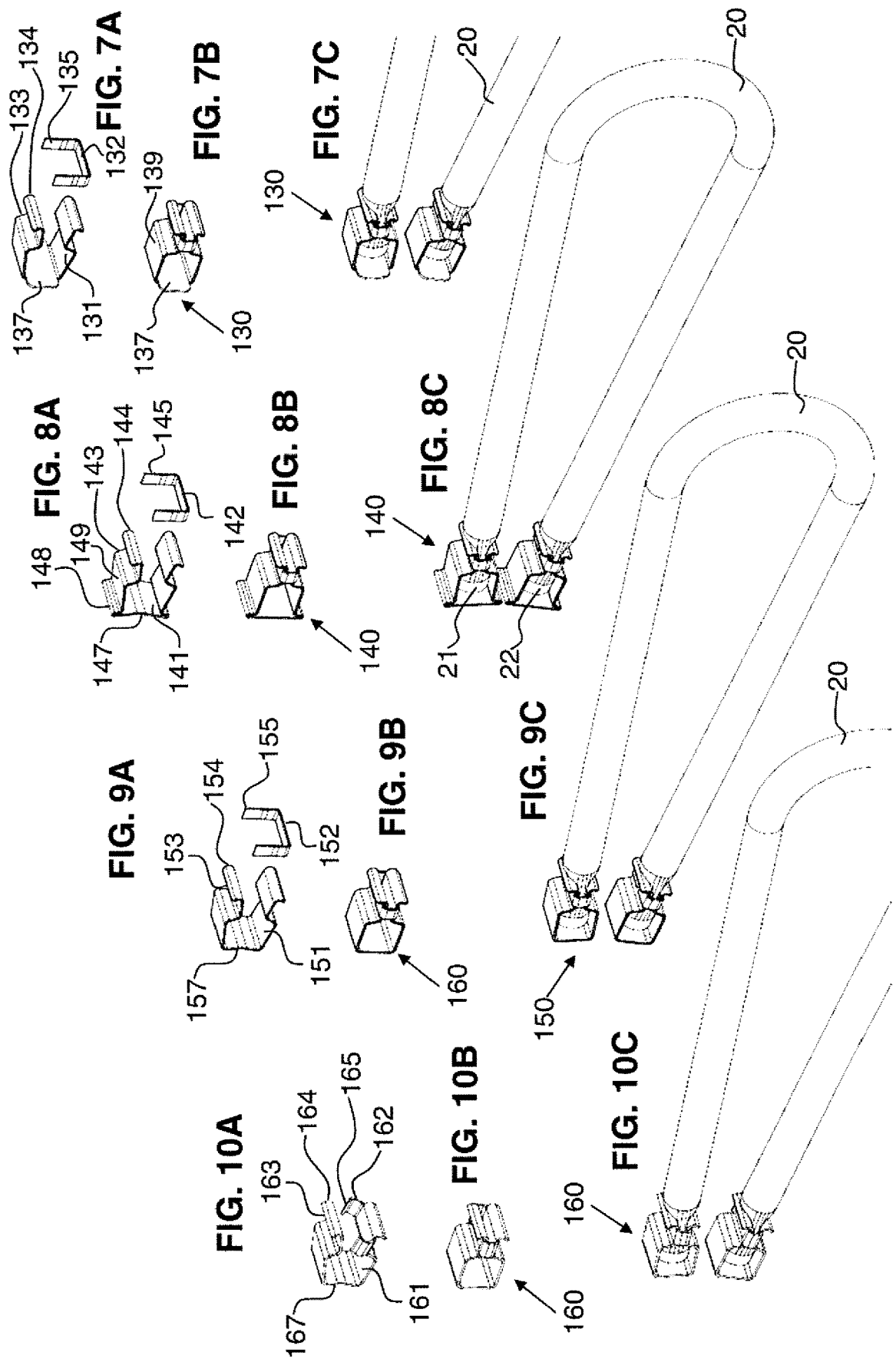

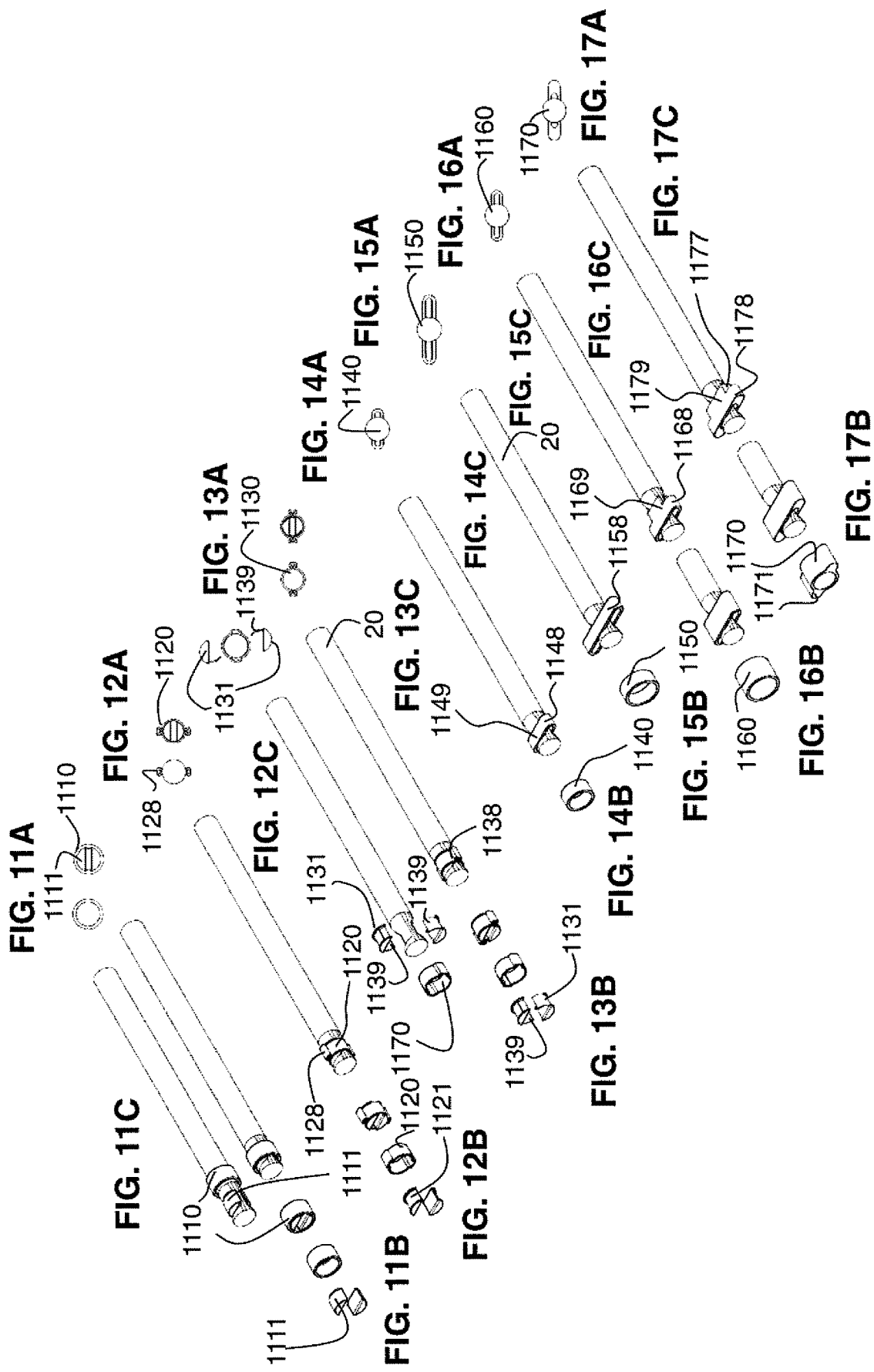

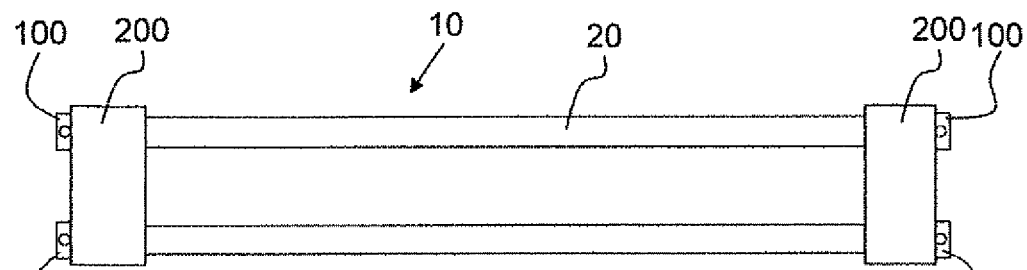
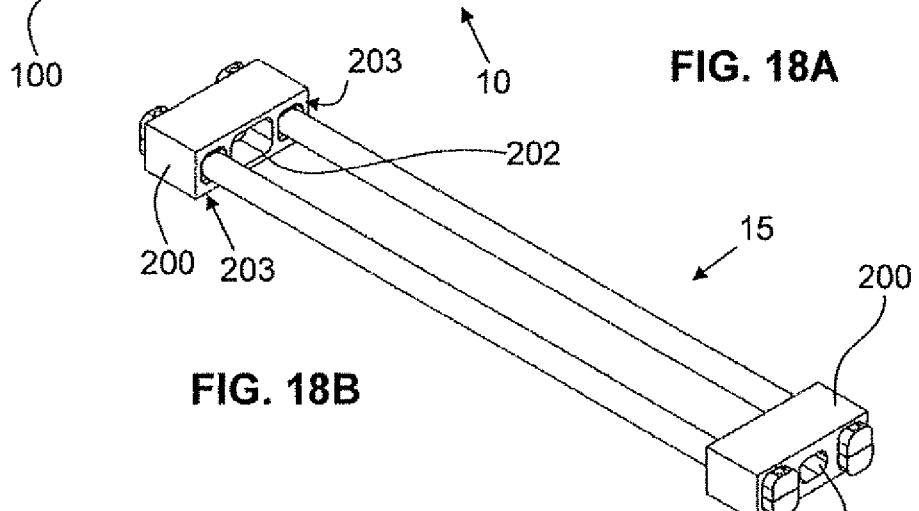
FIG. 18A
FIG. 18B
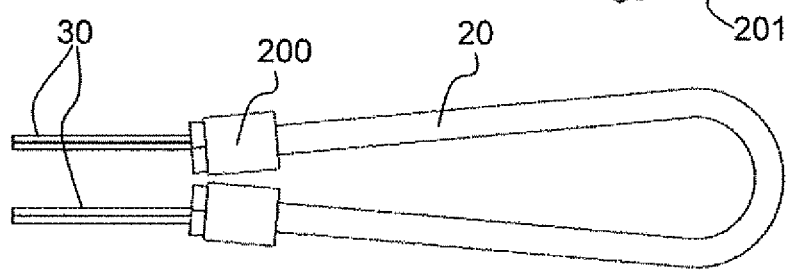
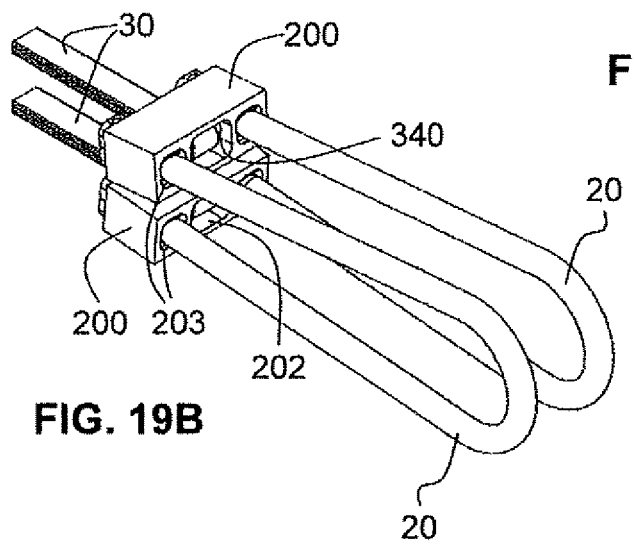
FIG. 19A
FIG. 19B

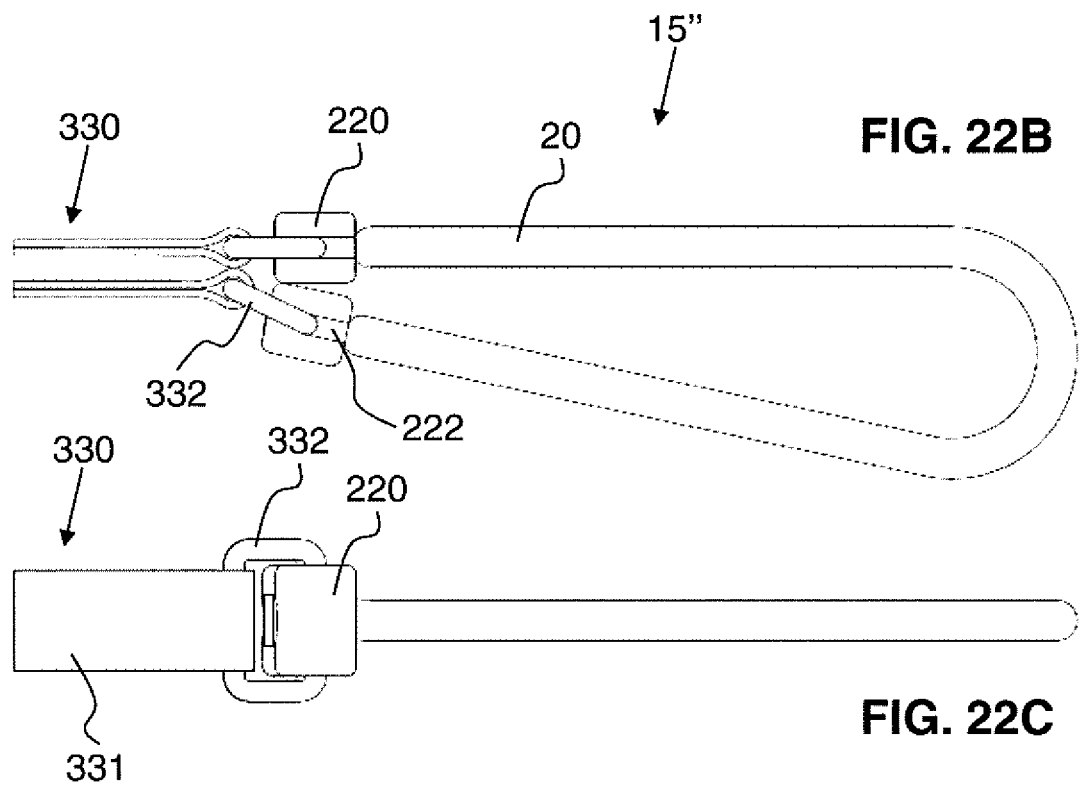
FIG. 22B
FIG. 22C
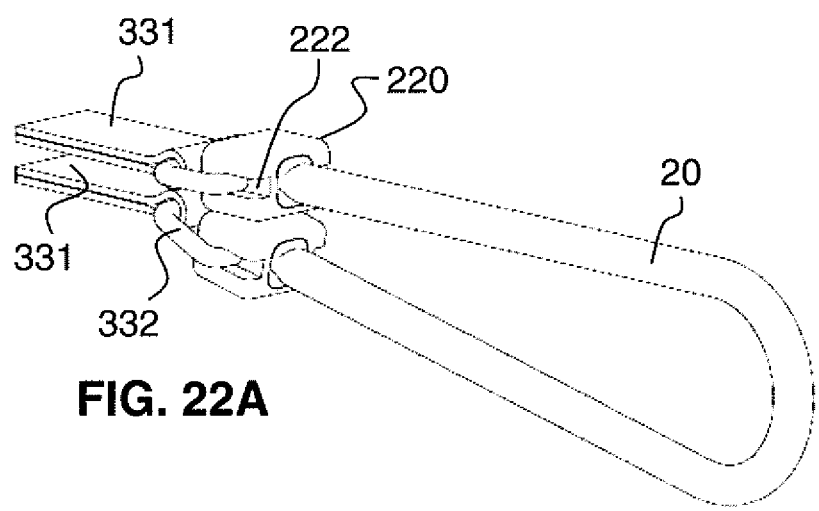
FIG. 22A

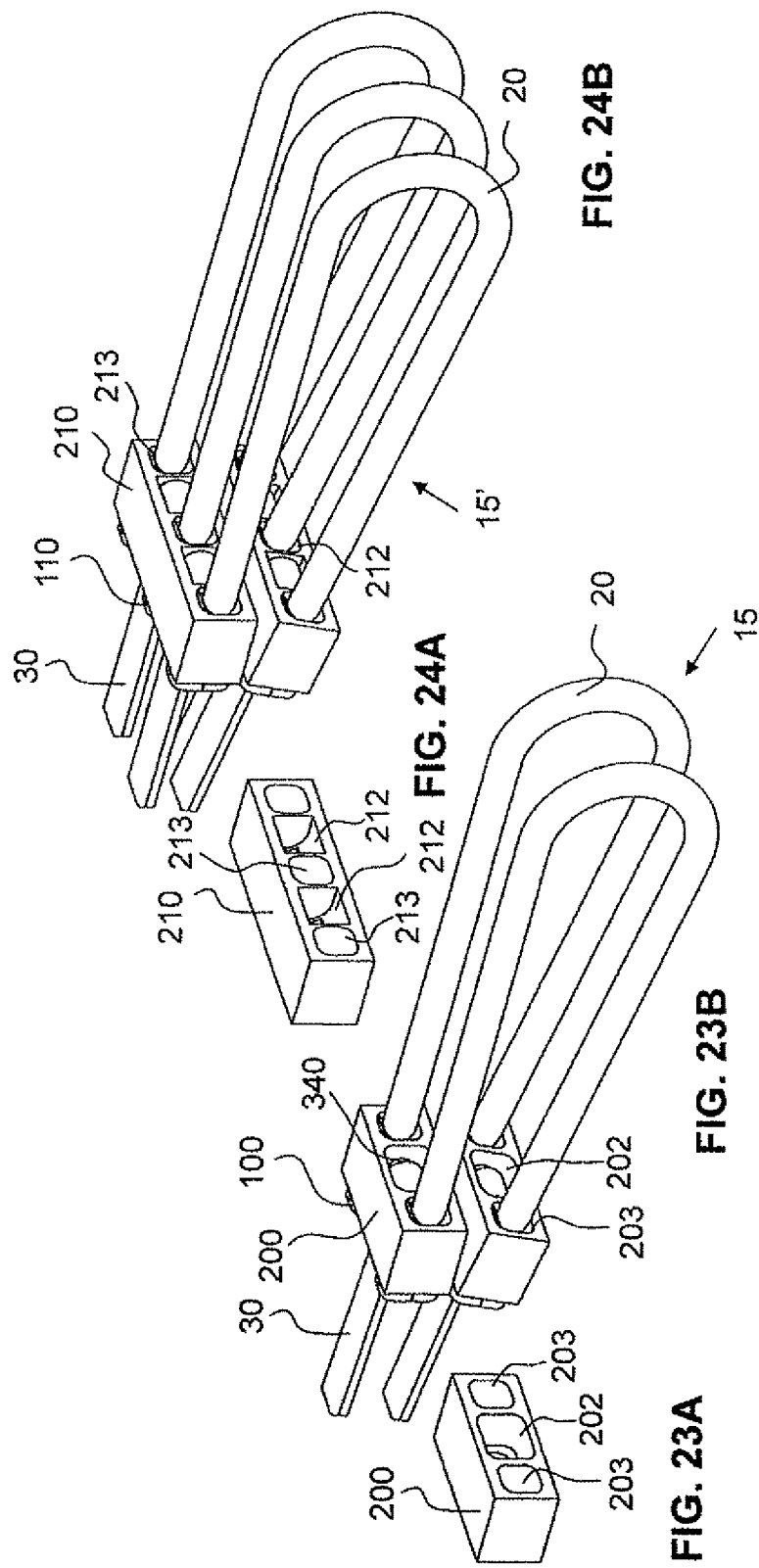

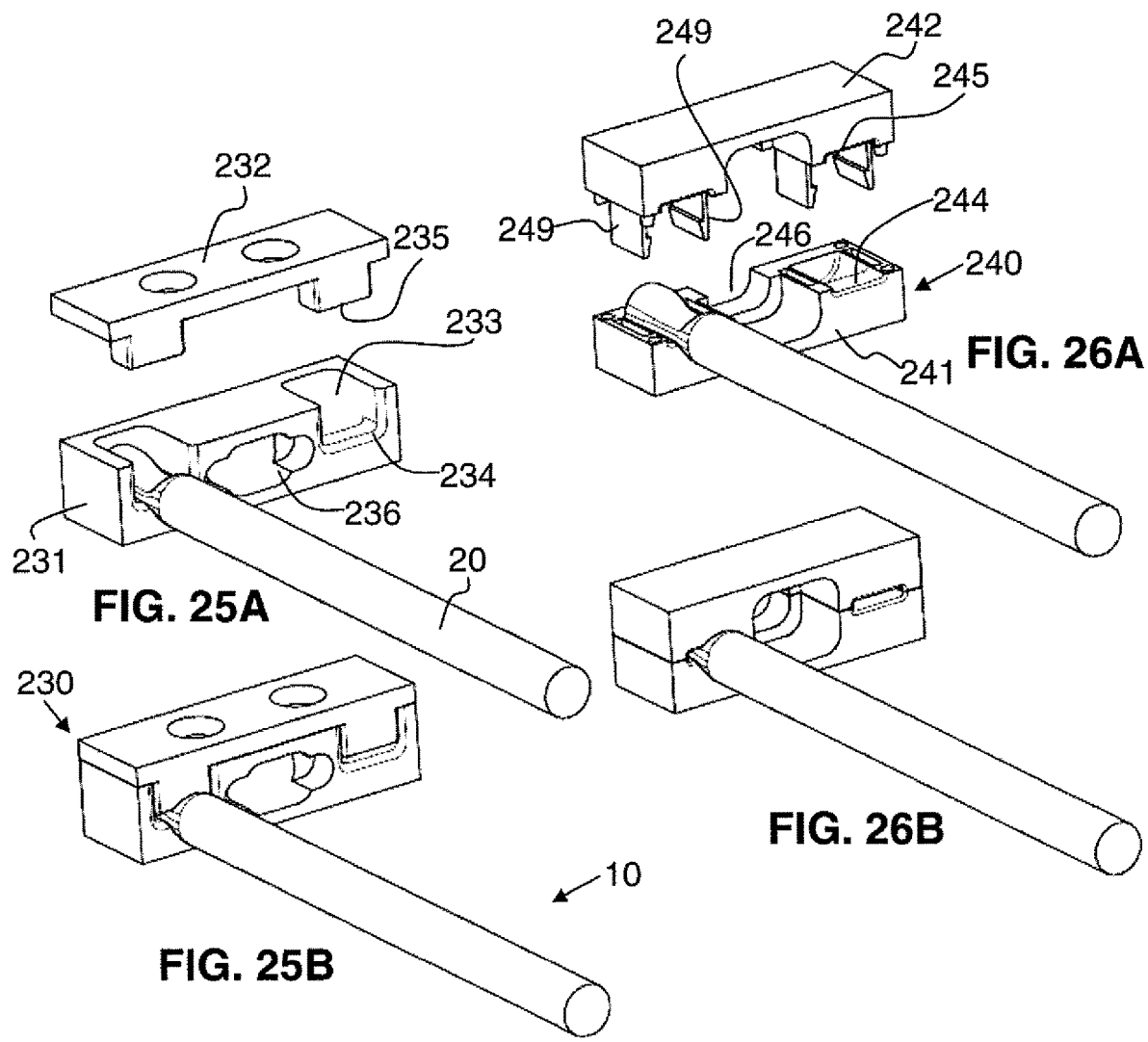

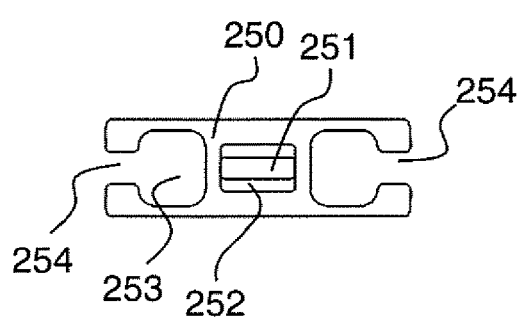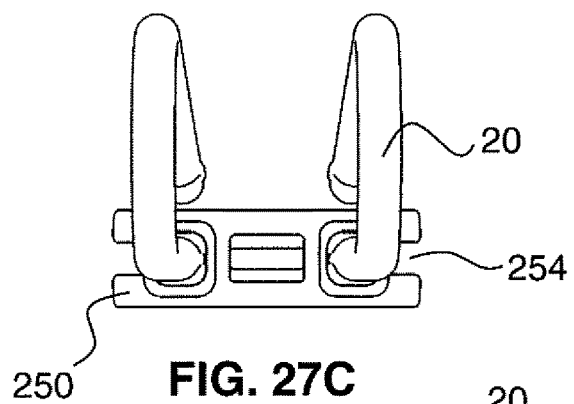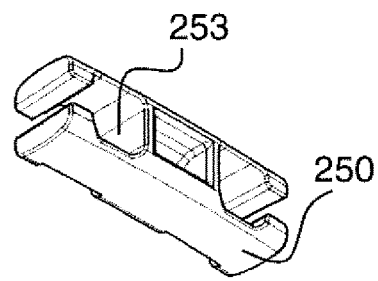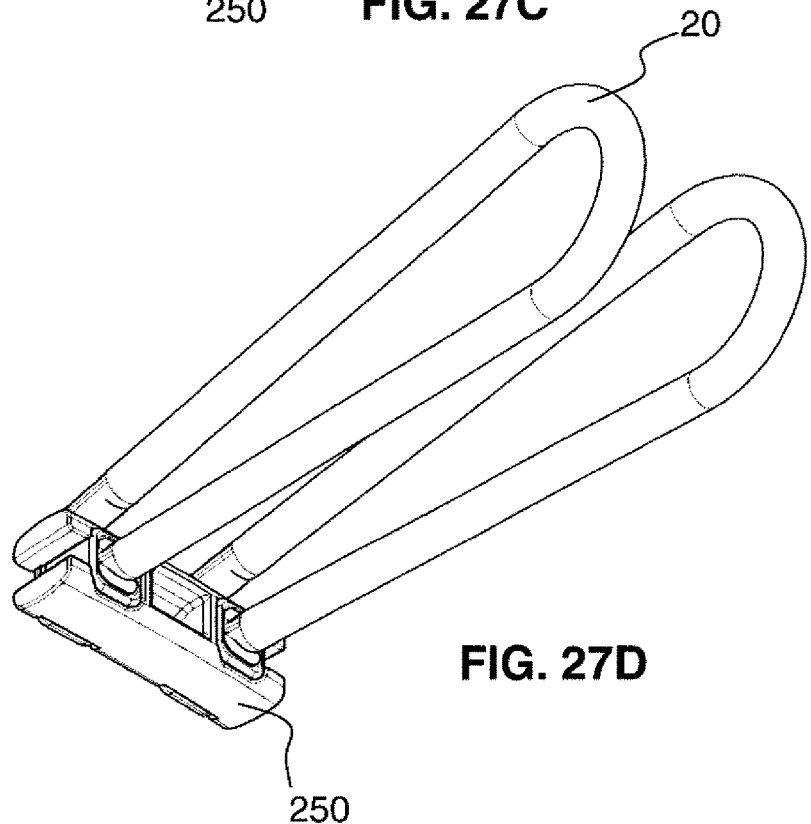
FIG. 27A
FIG. 27B
FIG. 27C
FIG. 27D

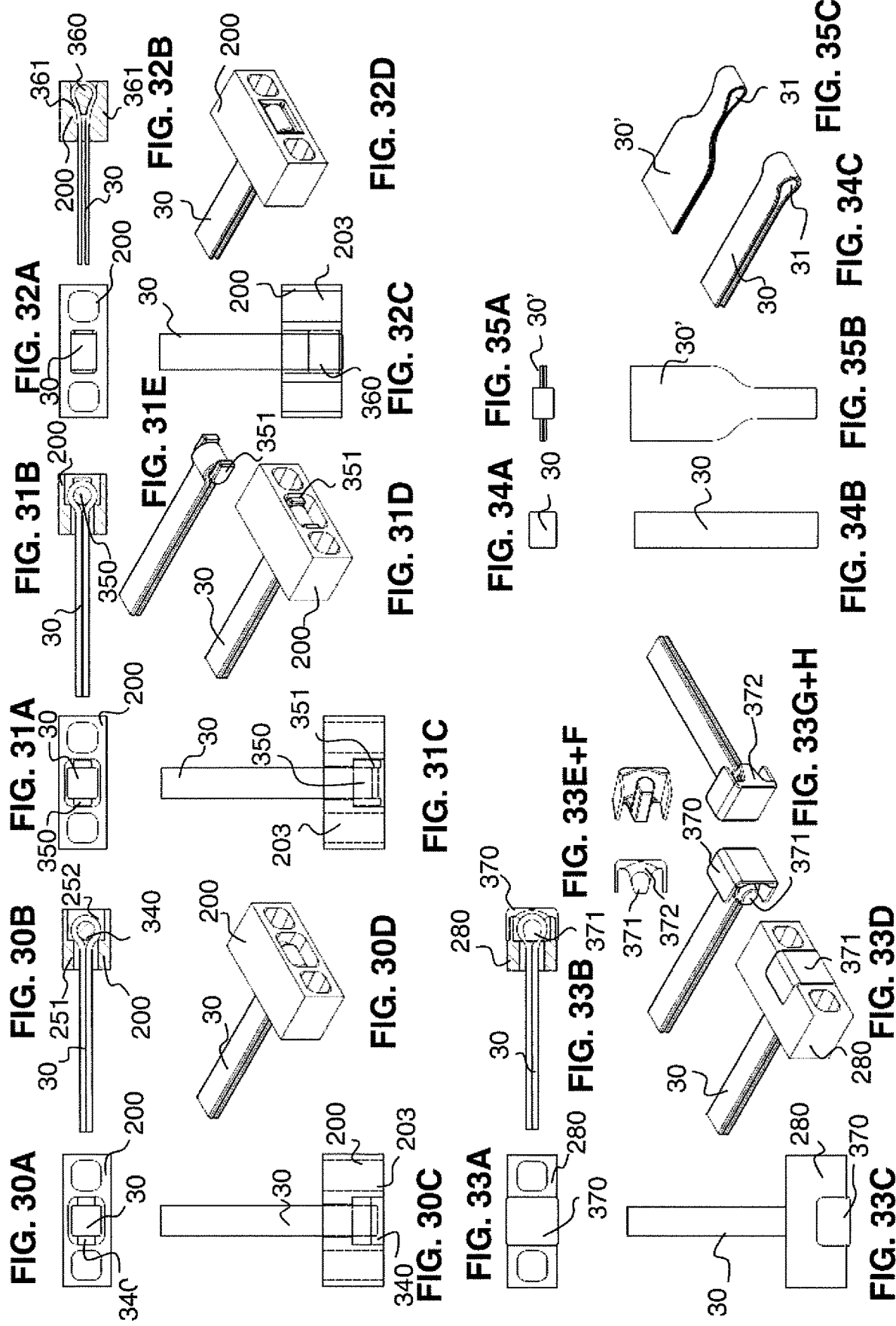

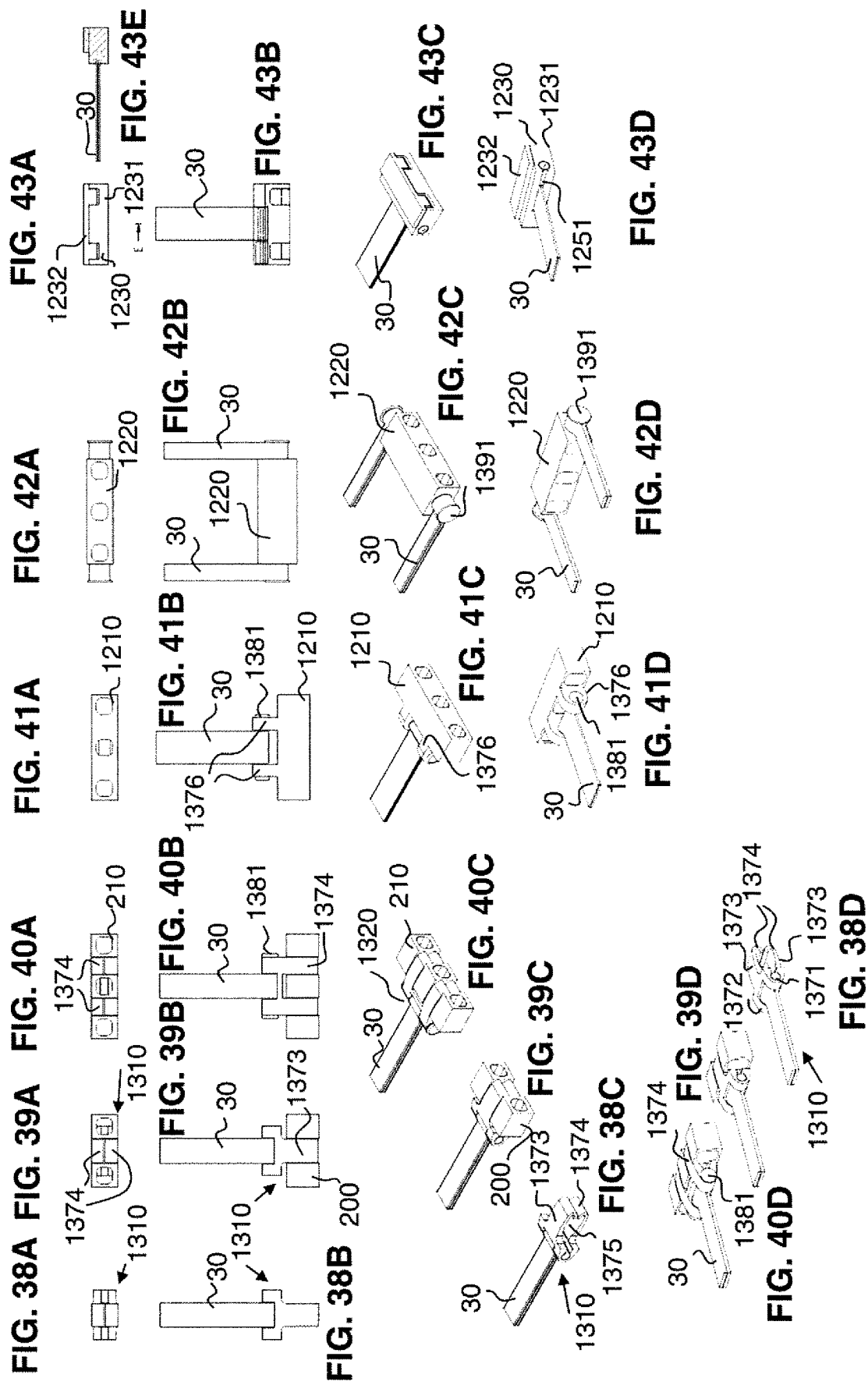

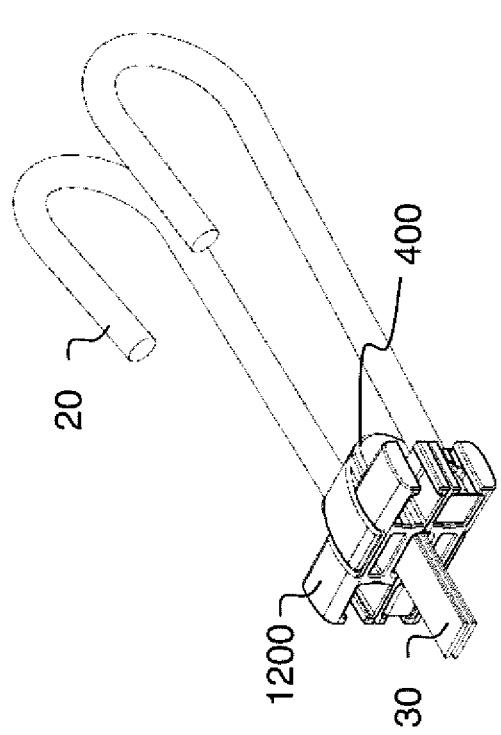
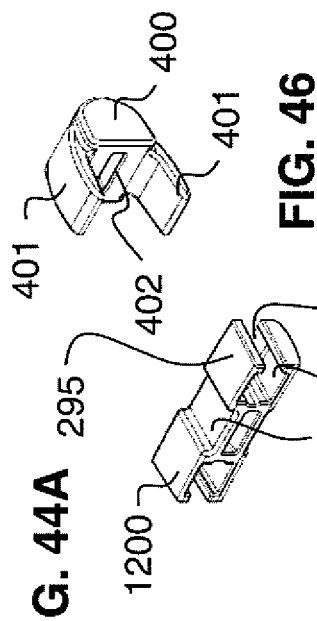
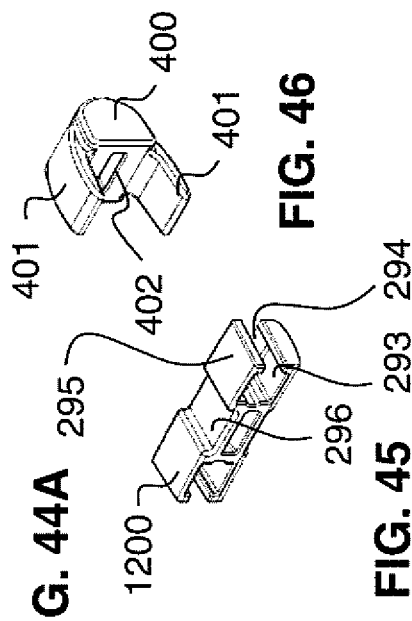
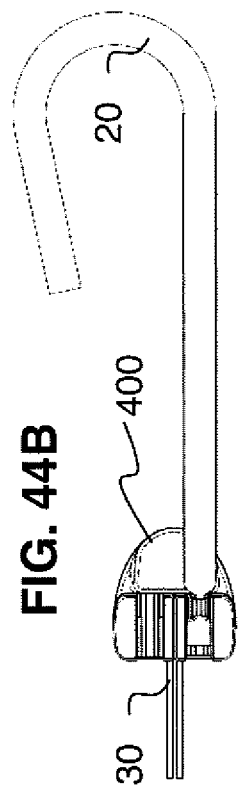
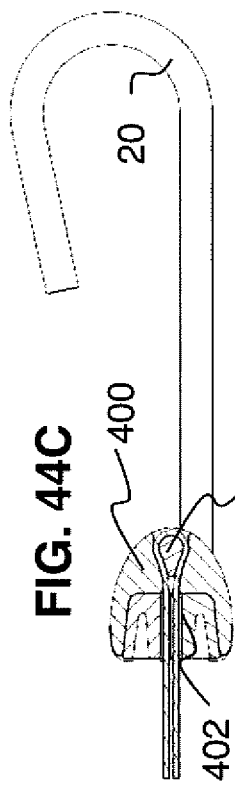
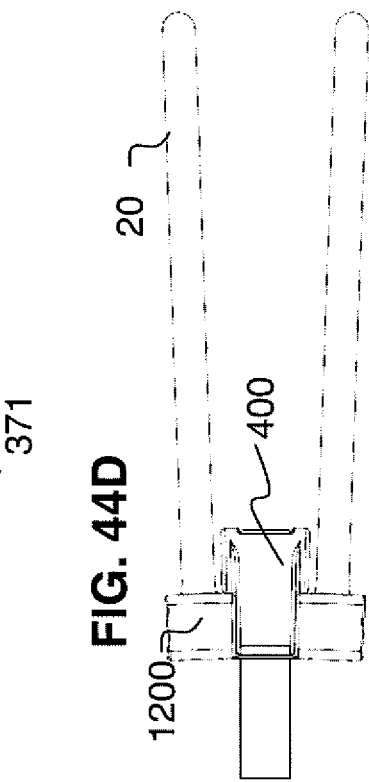

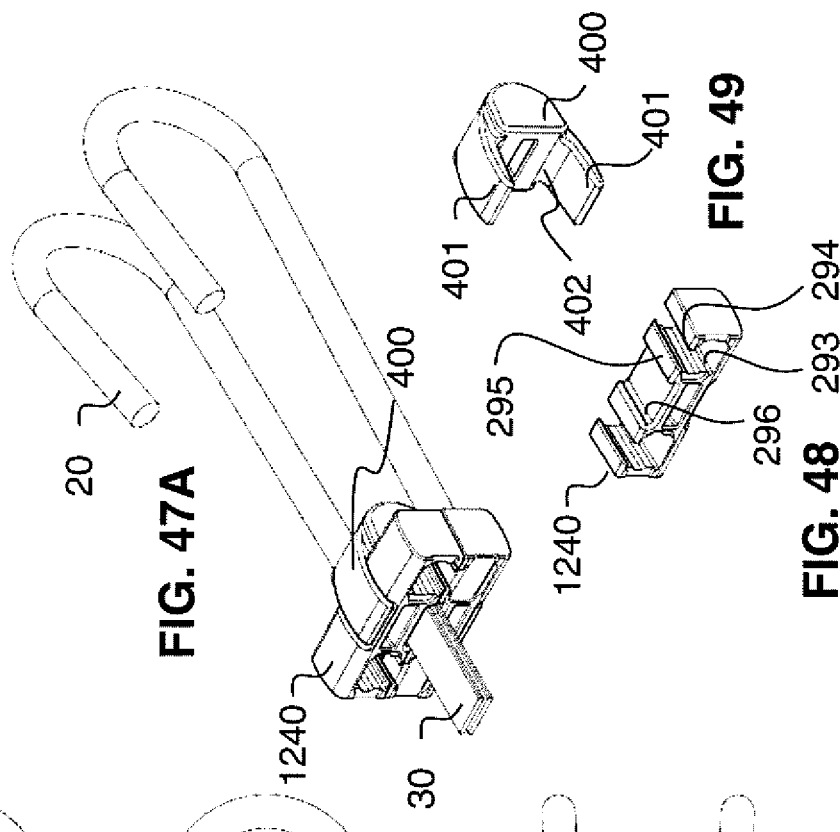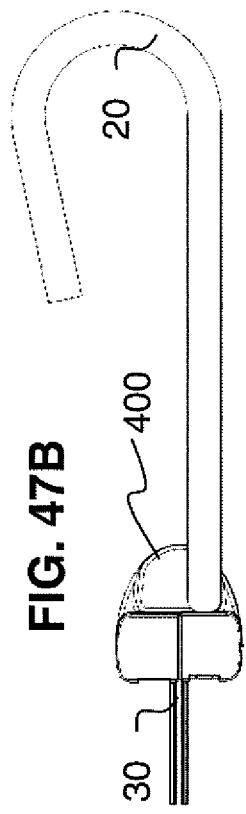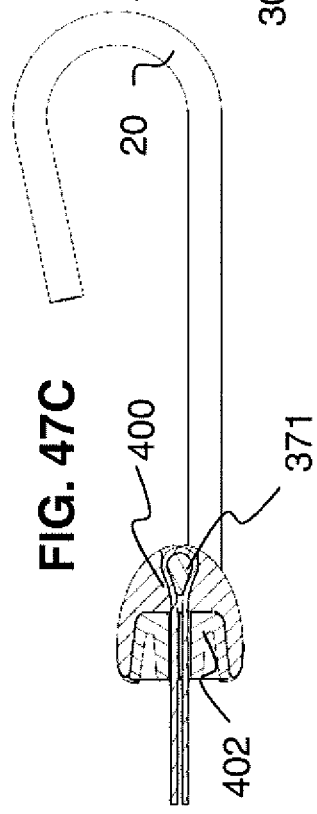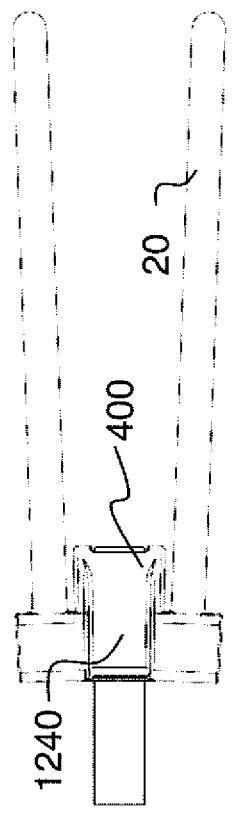

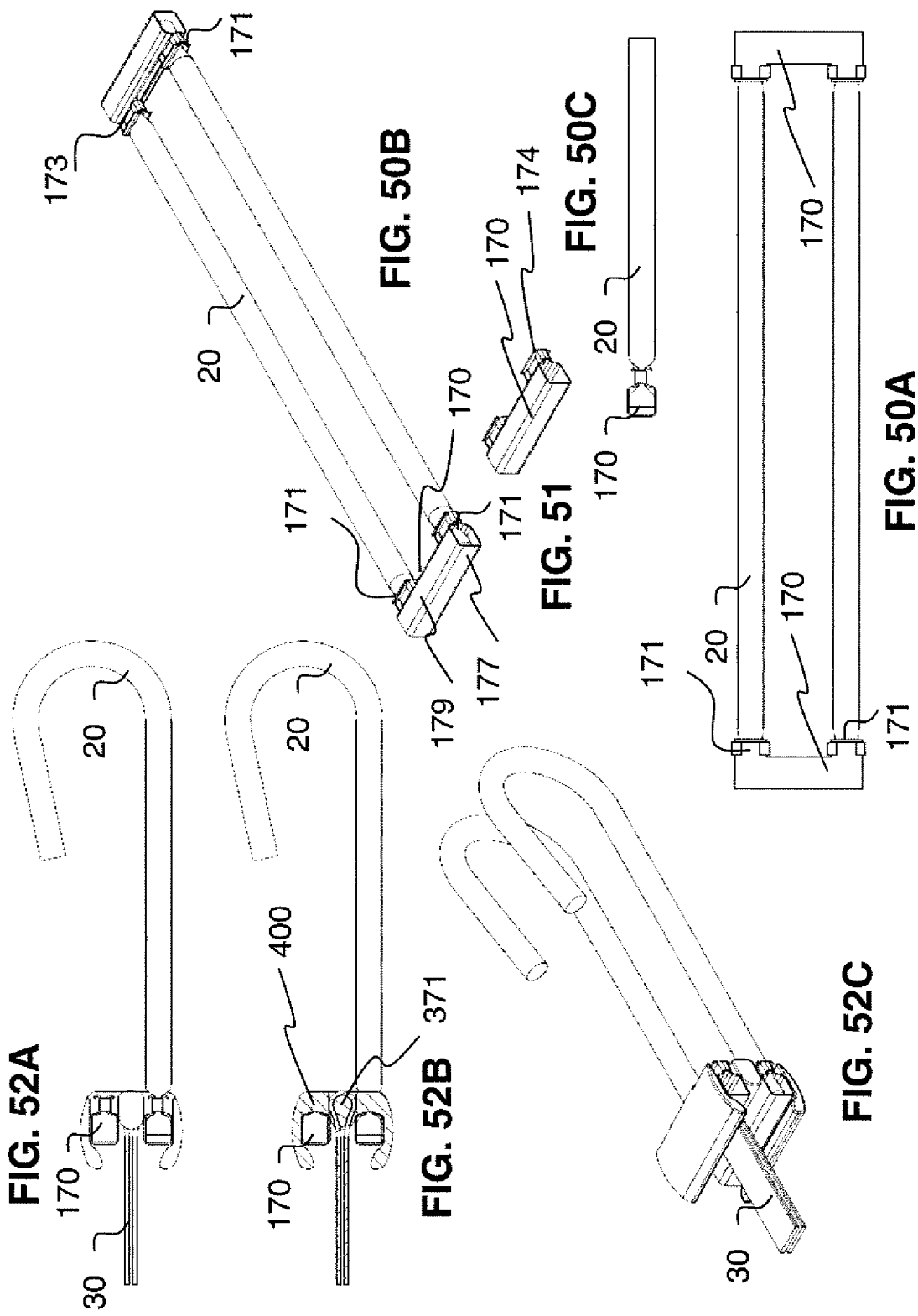

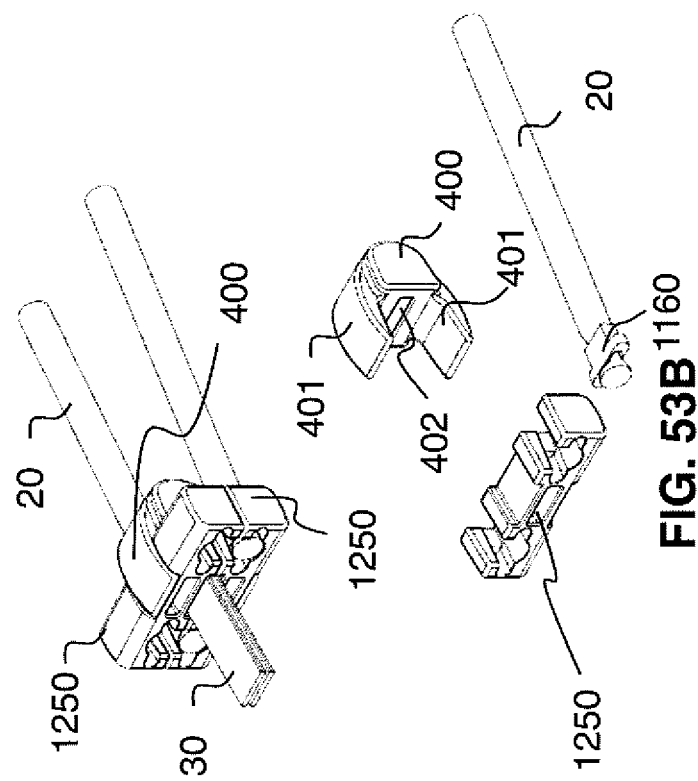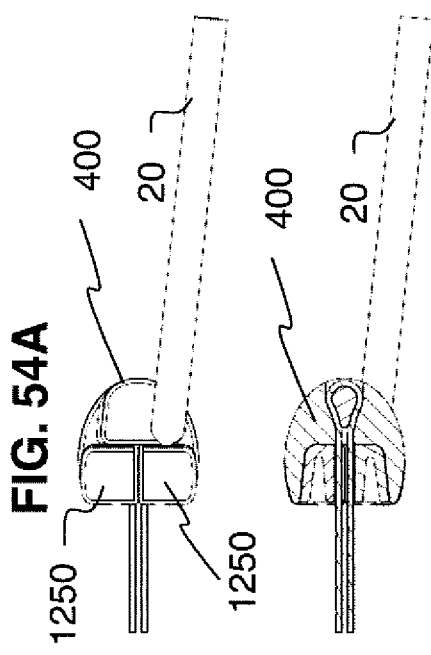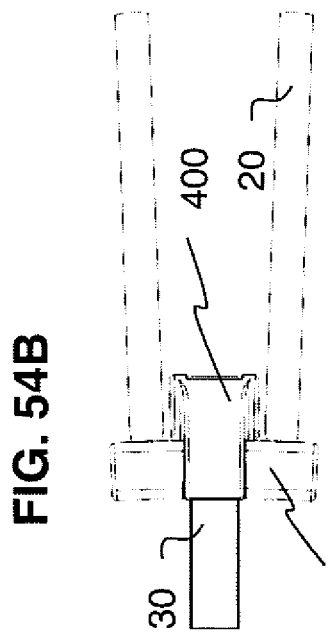

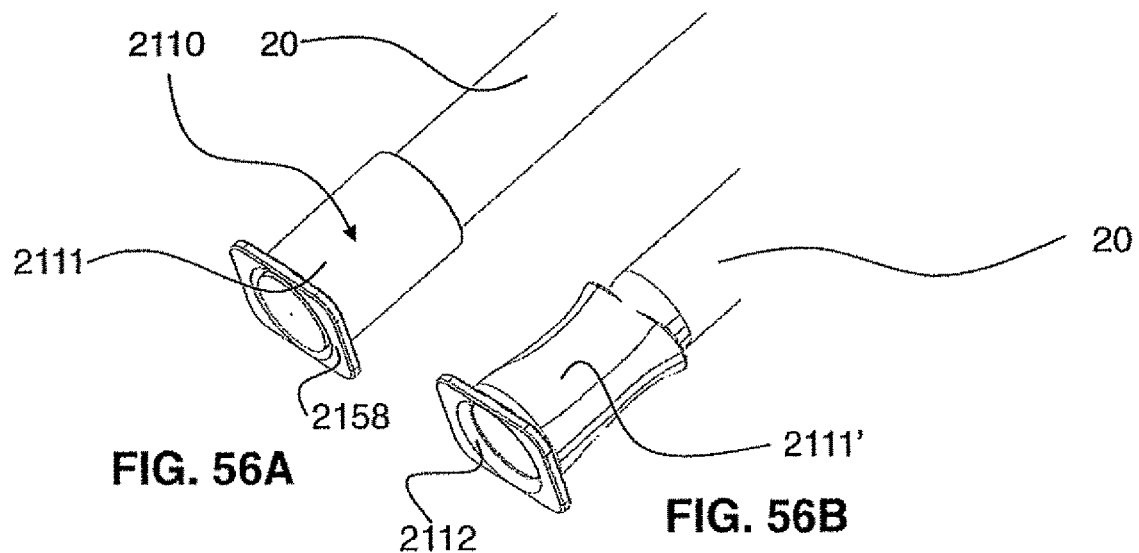
FIG. 56A
FIG. 56B
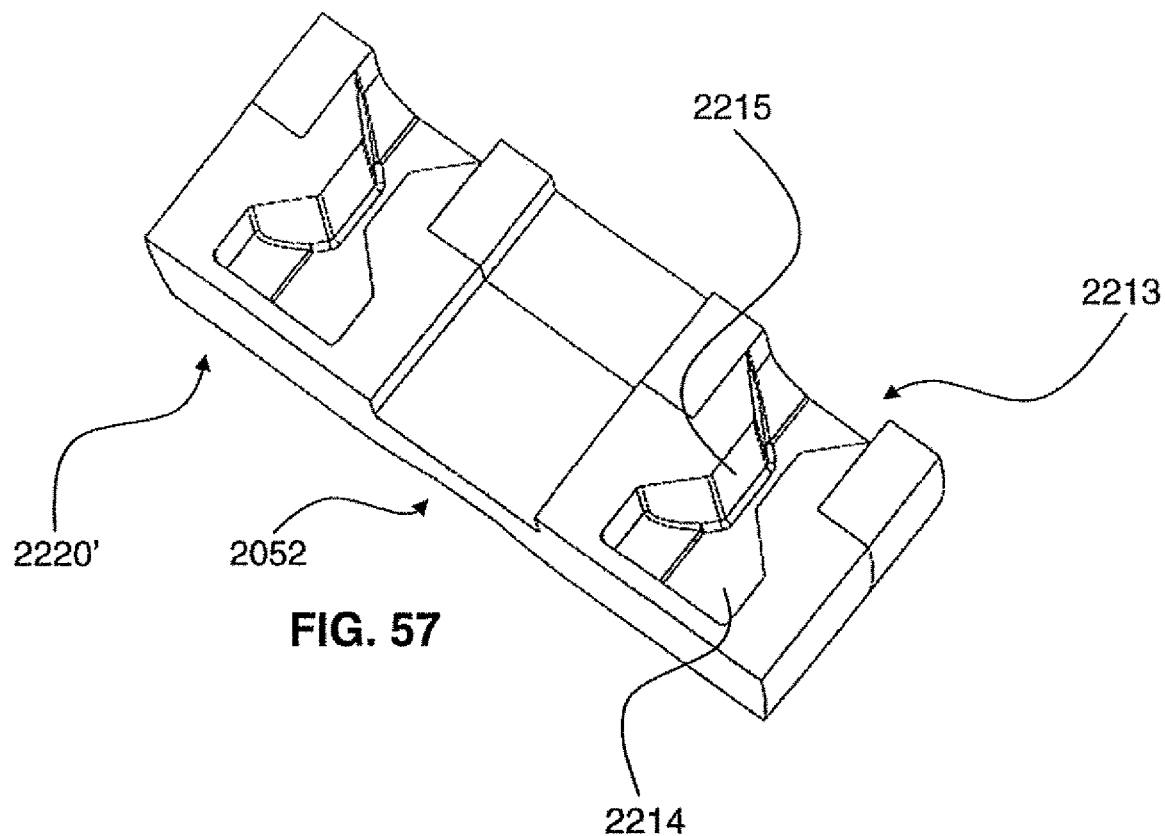
FIG. 57

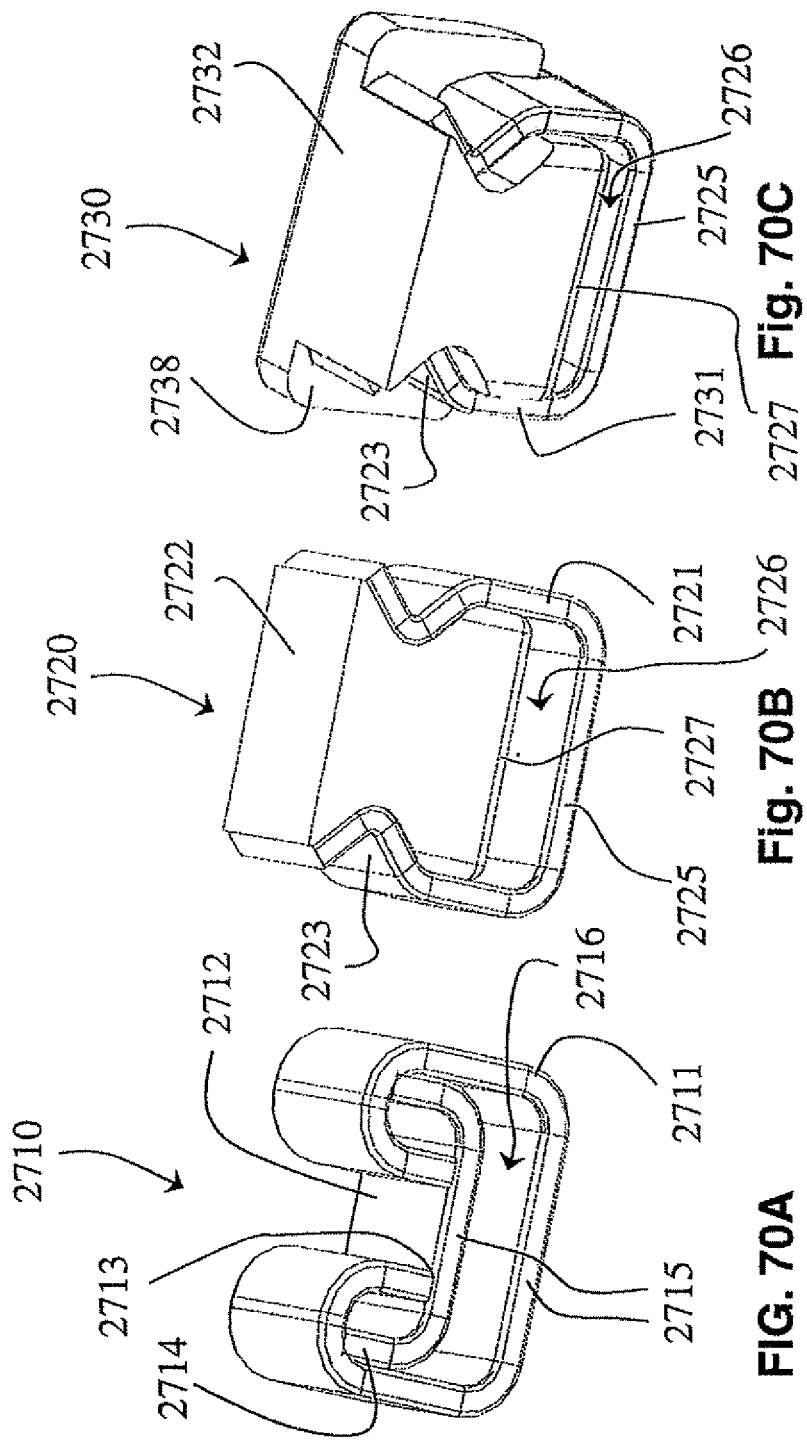

ELASTIC ELEMENT FOR SECURING A JUMP MAT TO A TRAMPOLINE FRAME

TECHNICAL FIELD

The present invention relates to an elastic element for securing a jump mat to a trampoline frame, having a terminating element which is provided in each case at each free end and which alters the diameter of the elastic element; a connector for an elastic element, and a terminating element for the same.

PRIOR ART

Trampolines, or mini trampolines, which are used for the promotion of health and for therapy purposes, require a suitable securing system, which is capable of oscillating, for the securing and tensioning or mounting of the jump mat.

It is known for the jump mat to be secured in frame devices of mini trampolines using steel springs. Steel-spring-based suspension arrangements however have the disadvantage that they tension the jump mat so as to be very taut. Furthermore, the steel springs give rise to disturbing squeaking noises during the use of the trampoline. When swinging or lightly jumping on steel-spring mini trampolines, a sinking depth to which the person exercising sinks into the mat amounts to just 20 millimeters to 60 millimeters, which corresponds to the damping braking travel upon impact. The impact forces are reduced only slightly by means of the steel spring tensioning arrangement. When training on devices with such a suspension arrangement of the jump mat, joints and the spinal column are therefore subjected to considerable loads.

DE 102 26 707 A1 describes a tensioning arrangement which operates using elastic cord loops and cord hooks rather than steel springs. The rubber cord method offers much greater elasticity, that is to say longer damping travels and therefore softer damping characteristics, which are often preferred in particular in the physiotherapy sector. The sinking depth in the case of mini trampolines is thus increased, and may amount to approximately 100 millimeters to 250 millimeters. This permits a more harmonious swinging movement and softer braking.

EP 2 540 352 has disclosed a further development of a cord hook for trampolines. The further development proposes providing a hook element with a first and with a second receiving portion, wherein the two receiving portions are separated from one another by a web with a rear tab element. The tab element is secured to the mat of the trampoline. Cord loops are used which are formed from a rubber cord portion, wherein end portions of the cord portion are laid so as to overlap one another pointing in different directions, and are fixed to form a ring. For the fixing of the cord loops, in the overlap zone, two sausage-shaped brackets are arranged adjacent to one another, with a spacing of 10 millimeters to 12 millimeters, so as to engage over the end portions running toward one another, and are firmly compressed. In the tensioning arrangement, the cord loop is mounted into the first receiving portion, is looped around the frame device, is led back to the hook element, and is mounted there in the second receiving portion. The web that separates the first and second receiving portions ensures that the cord portions situated in the first receiving portion and in the second receiving portion are supported separately from one another and do not rub against one another, whereby wear resistance is improved. It is therefore the case that four cord portions of the cord loop extend away from this double hook construction, which cord portions brace the mat to the frame.

Of these four cord portions which extend away from the hook element, three of these have equally long active tension sections. The fourth cord portion has the above-described sausage-shaped bracket assembly, which disadvantageously reduces the active tension section thereof. In the middle of the tension section, the brackets form a rigid block, which shortens the rubber section available for the stretching to approximately 20 millimeters. This can affect more than 20 percent of the respective partial cord section.

Owing to the resulting tension length difference, the cord portions of the tensioned cord loop behave differently under load. The fourth cord portion with the sausage-shaped brackets is subjected to much greater load than the other three cord portions, and more quickly reaches the maximum stretching length under load owing to the shortened active rubber cord section. This firstly influences the oscillation quality, because it is not possible for the entire stretching potential of the rubber to be utilized uniformly for generating the oscillation. Secondly, the overstretching, which occurs earlier, of the fourth cord section leads to faster stress aging, as a result of which the cord loop must be prematurely exchanged.

An elastic element as per the preamble of claim 1 is known from WO 2011/032173, which may be provided as a replacement for a metal spring for the securing of a jump mat to a trampoline frame. In FIGS. 12 and 13 of said document, the elastic elements have so-called bungee terminators, which are provided as nodes or bulb-like thickened portions at the end zones of the free ends of the elastic elements, said bungee terminators being provided individually or severally so as to be lined up one behind the other. They serve as terminating elements and raster elements for the subsequent re-tensioning of the elastic element in different positions, and are mounted into laterally provided openings of a connector element, which itself is secured, in particular sewn, by means of a tab to the jump mat.

A connector element according to WO 2011/032173 comprises two lateral openings for an elastic element for the securing of a jump mat to a trampoline frame as a first receptacle for producing a connection to the frame of the trampoline, and at least one second receptacle for a tension band secured to a jump mat.

PRESENTATION OF THE INVENTION

It is an object of the present invention to specify an elastic element which further improves the securing of a jump mat in a trampoline frame.

Also proposed is a connector for an elastic element, which permits a secure connection. Said connector permits simpler and less expensive production (sewing) of the jump mat, because the connectors have to be connected to the mat and/or mounted, with the tensioning intensity of the rubber cords desired by the customer, only at the time at which the trampoline is set up. The type of connector proposed here also permits a straightforward exchange in the event of a defect.

An elastic element for securing a jump mat to a trampoline frame has a terminating element which is provided in each case at each free end and which alters the diameter of the elastic element. Here, the elastic element comprises a flexible cord element and two separate terminating elements which, at the free ends, are connected with a clamping fit to the flexible cord element, wherein the terminating element is held with a form fit and/or clamping fit in a connector connected to the jump mat.

In particular, the terminating elements may be C-shaped, and the free ends thereof may comprise two oppositely situated clamping bodies; if appropriate, a terminating element may also comprise two C-shaped clamps which are connected by means of a transversely running body, such that fewer terminating elements are required, and they can furthermore simultaneously perform the function of the connector.

Here, the oppositely situated outer sides of the free ends of the terminating elements may taper with a narrowing spacing in the direction of the flexible cord element.

An elastic element may have an additional bracket, the free ends of which are bent around the free ends of the terminating element so as to hold said terminating element with clamping action on the free end of the flexible cord element.

The terminating element may also have a flanged portion which projects beyond the space profile of the free ends of the terminating element in order to be anchored in the associated connector.

The terminating element may be ring-shaped, and the projecting-out flanged portion may be generated from a ring-shaped element by clamping. Here, additionally, in each case lateral portions of the laterally projecting-out flanged portions may have side walls generated by punching and folding.

A connector for an elastic element is equipped with at least one first receptacle for the terminating element and with at least one second receptacle for a tension band secured to a jump mat, wherein the at least first receptacles are in each case one simple passage hole, and in that the diameter of the passage hole is larger than the diameter of the flexible cord element of the elastic element.

A connector for securing a jump mat to a trampoline frame has an elastic element having a terminating element which is provided in each case at each free end and which alters the diameter of the elastic element, and is equipped with at least one first receptacle for the terminating element and with at least one second receptacle for a tension band secured to a jump mat, wherein the at least one first receptacle is in each case one blind hole, in that the connector comprises a lower part and an upper part, and in that the upper part, when set down onto the lower part, encompasses the free end of the flexible cord element with clamping action.

Said elements may be used in the context of a method for securing a jump mat to a trampoline frame which has the steps:
a) providing a multiplicity of elastic elements,
b) looping a cord loop formed from the at least one elastic element around a portion of the trampoline frame,
c) mounting the free ends of the elastic elements into respective connectors,
d) mounting at least one tension band into the connector(s) connected to the free ends of the elastic elements,
e) repeating steps b) to d) for all provided elastic elements along the circumference of the trampoline frame.

In the case of a method of said type, the steps e) and d) may be performed in each case in the reverse sequence.

A method for producing an elastic element may have the method steps:
a) providing flexible cord elements, terminating elements and connectors,
b) leading the in each case free ends of the flexible cord elements through first receptacles of the connectors,
c) equipping the free ends of the flexible cord elements with terminating elements, which are connected with a clamping fit to the flexible cord element.

It is advantageous here that, for the securing of the elastic element to a trampoline, the following additional steps are used:
d) leading at least one loop of a tension band through second receptacles of the connectors and
e) locking the position of the loop of the tension band on the connector.

It is a further object of the present invention to specify a tension band for securing to a jump mat on a trampoline frame, which tension band permits a smaller design of the connectors or connector units. In other words, it is an aim for the multiplicity of tension bands connected to the jump mat to also be capable of bearing higher loads than conventional tension bands.

Said object is achieved by means of a tension band, in which the two free ends are arranged so as to lie one on top of the other, and opposite these, a loop is provided in a retention region, wherein the loop is connectable by means of a retention element to the connector or to a connector unit and thus indirectly to the trampoline frame, furthermore comprising a holding region at the free ends for the purposes of securing, in particular sewing, to a jump mat, in that the holding region is, transversely with respect to the longitudinal extent of the tension band, wider than the retention region, and in that, between holding region and retention region, there is provided a transition region which adapts the width in the transverse dimension.

The tension band is in particular a textile band which, from one side of the jump mat, in particular from the underside, is secured by means of both layers lying one on top of the other to the jump mat. The band is then sewn to the further layer of the jump mat by means of three layers.

Further embodiments are specified in the dependent claims.

BRIEF DESCRIPTION OF THE DRAWINGS

Preferred embodiments of the invention will be described below on the basis of the drawings, which serve merely for explanation and which are not to be interpreted as limiting. In the drawings:

FIG. 1 shows a perspective view of an elastic element with a terminating element as per an exemplary embodiment of the invention and with a receptacle for said terminating element;

FIG. 2 shows a perspective view of the terminating element as per FIG. 1;

FIG. 3 shows a perspective view of a terminating element similar to that as per FIG. 2;

FIG. 4 shows a perspective view of the terminating element as per FIG. 1 before being bent into its final shape;

FIG. 5 shows a perspective view of an elastic element with a terminating element according to a further exemplary embodiment of the invention;

FIG. 6 shows a perspective view of the terminating element as per FIG. 5;

FIG. 7A shows a perspective view of a two-part terminating element according to an exemplary embodiment of the invention in the open state;

FIG. 7B shows a perspective view of the two-part terminating element as per FIG. 7A in the closed state without a flexible cord element;

FIG. 7C shows a perspective view of two two-part terminating elements as per FIG. 7A in the closed state with a flexible cord element shaped to form a loop (illustrated in part);

FIG. 8A shows a perspective view of a further two-part terminating element according to an exemplary embodiment of the invention in the open state;

FIG. 8B shows a perspective view of the two-part terminating element as per FIG. 8A in the closed state without a flexible cord element;

FIG. 8C shows a perspective view of two two-part terminating elements as per FIG. 8A in the closed state with a flexible cord element shaped to form a loop;

FIG. 9A shows a perspective view of a further two-part terminating element according to an exemplary embodiment of the invention in the open state;

FIG. 9B shows a perspective view of the two-part terminating element as per FIG. 9A in the closed state without a flexible cord element;

FIG. 9C shows a perspective view of two two-part terminating elements as per FIG. 9A in the closed state with a flexible cord element shaped to form a loop;

FIG. 10A shows a perspective view of a further single-part terminating element according to an exemplary embodiment of the invention in the open state;

FIG. 10B shows a perspective view of the single-part terminating element as per FIG. 10A in the closed state without a flexible cord element;

FIG. 10C shows a perspective view of two single-part terminating elements as per FIG. 10A in the closed state with a flexible cord element shaped to form a loop;

FIG. 11A shows two front views of a further terminating element according to an exemplary embodiment of the invention in one case with inner clamping bodies;

FIG. 11B shows an exploded view and a perspective view of the terminating element as per FIG. 11A without a flexible cord element;

FIG. 11C shows two perspective views of the terminating element as per FIG. 11A in the partially prepared or closed state on and with a flexible cord element;

FIG. 12A shows two front views of a further terminating element according to an exemplary embodiment of the invention;

FIG. 12B shows an exploded view and a perspective view of the terminating element as per FIG. 12A in the open state without a flexible cord element;

FIG. 12C shows a perspective view of the terminating element as per FIG. 12A in the closed state on and with a flexible cord element;

FIG. 13A shows an exploded view and two front views of a further terminating element according to an exemplary embodiment of the invention;

FIG. 13B shows an exploded view and a perspective view of the terminating element as per FIG. 13A in the open state without a flexible cord element;

FIG. 13C shows an exploded view and a perspective view of the terminating element as per FIG. 13A in the preparation for the closed state and in the closed state on and with a flexible cord element;

FIG. 14A shows a front view of a further terminating element according to an exemplary embodiment of the invention in the open state;

FIG. 14B shows a perspective view of the terminating element as per FIG. 14A in the open state without a flexible cord element;

FIG. 14C shows a perspective view of the terminating element as per FIG. 14A in the closed state on and with a flexible cord element;

FIG. 15A shows a front view of a further terminating element according to an exemplary embodiment of the invention in the open state;

FIG. 15B shows a perspective view of the terminating element as per FIG. 15A in the open state without a flexible cord element;

FIG. 15C shows a perspective view of the terminating element as per FIG. 15A in the closed state on and with a flexible cord element;

FIG. 16A shows a front view of a further terminating element according to an exemplary embodiment of the invention in the open state;

FIG. 16B shows a perspective view of the terminating element as per FIG. 16A in the open state without a flexible cord element and a perspective view of the terminating element as per FIG. 16A clamped on the flexible cord element;

FIG. 16C shows a perspective view of the terminating element as per FIG. 16A in the closed state on and with a flexible cord element;

FIG. 17A shows a front view of a further terminating element according to an exemplary embodiment of the invention in the open state;

FIG. 17B shows a perspective view of the terminating element as per FIG. 17A in the open state without a flexible cord element and a perspective view of the terminating element as per FIG. 17A clamped on the flexible cord element;

FIG. 17C shows a perspective view of the terminating element as per FIG. 17A in the closed state on and with a flexible cord element;

FIG. 18A shows a plan view of a connecting unit with two elastic elements with in each case one further terminating element according to an exemplary embodiment of the invention, inserted into two connecting elements;

FIG. 18B shows a perspective view of the connecting unit as per FIG. 18A;

FIG. 19A shows a side view of the connecting unit as per FIG. 18A with elastic elements shaped to form a loop and with two tension bands mounted into the connecting units;

FIG. 19B shows a perspective view of the connecting unit as per FIG. 19A;

FIG. 22A shows a perspective view of a connecting unit according to a further exemplary embodiment of the invention with a connecting band;

FIG. 22B shows a side view of a connecting unit with an elastic element with two further terminating elements according to an exemplary embodiment of the invention, inserted into two connecting units;

FIG. 22C shows a plan view of the connecting unit as per FIG. 22A;

FIG. 23A shows a perspective view of a connector similar to that from FIG. 19;

FIG. 23B shows a perspective view of a connecting unit with a tension band connected by means of the connector from FIG. 23A;

FIG. 24A shows a perspective view of a connector similar to that from FIG. 20;

FIG. 24B shows a perspective view of a connecting unit with a tension band connected by means of the connector from FIG. 24A;

FIG. 25A shows a perspective view of a closed, two-part connector with an inserted flexible cord element;

FIG. 25B shows a perspective exploded view of the connector from FIG. 25A;

FIG. 26A shows a perspective view of a closed, two-part connector with an inserted flexible cord element;

FIG. 26B shows a perspective exploded view of the connector from FIG. 26A;

FIG. 27A shows a front view of a further connector according to an exemplary embodiment;

FIG. 27B shows a perspective view of the connector from FIG. 27A;

FIG. 27C shows a front view of the connector as per FIG. 27A with two flexible cord elements, in part with terminating elements;

FIG. 27D shows a perspective view of the subject matter from FIG. 27C;

FIG. 30A shows a front view of a further connector according to an exemplary embodiment with inserted tension band and band connector;

FIG. 30B shows a sectional side view of the connector with tension band and band connector from FIG. 30A;

FIG. 30C shows a partially sectional plan view of the connector with tension band and band connector from FIG. 30A;

FIG. 30D shows a perspective view of the subject matter from FIG. 30A;

FIG. 31A shows a front view of a further connector according to an exemplary embodiment with inserted tension band and band connector;

FIG. 31B shows a sectional side view of the connector with tension band and band connector from FIG. 31A;

FIG. 31C shows a partially sectional plan view of the connector with tension band and band connector from FIG. 31A;

FIG. 31D shows a perspective view of the subject matter from FIG. 31A;

FIG. 31E shows a perspective view of the band shown in in FIG. 31D;

FIG. 32A shows a front view of a further connector according to an exemplary embodiment with inserted tension band and band connector;

FIG. 32B shows a sectional side view of the connector with tension band and band connector from FIG. 32A;

FIG. 32C shows a partially sectional plan view of the connector with tension band and band connector from FIG. 32A;

FIG. 32D shows a perspective view of the subject matter from FIG. 32A;

FIG. 33A shows a front view of a further connector according to an exemplary embodiment with inserted tension band and band connector;

FIG. 33B shows a sectional side view of the connector with tension band and band connector from FIG. 33A;

FIG. 33C shows a partially sectional plan view of the connector with tension band and band connector from FIG. 33A;

FIG. 33D shows a perspective view of the subject matter from FIG. 33A and a partial view of the tension band and of the band connector;

FIG. 33E shows a side view of the band connector from FIG. 33A;

FIG. 33F shows a perspective view of the band connector from FIG. 33E;

FIG. 33G shows a perspective view of the band connector from FIG. 33E with inserted band;

FIG. 33H shows a different perspective view, in relation to FIG. 33G, of the band connector with inserted band;

FIG. 34A shows a front view of the tension band as per one of FIGS. 30 to 33;

FIG. 34B shows a plan view of the tension band from FIG. 34A;

FIG. 34C shows a perspective view of the tension band from FIG. 34A;

FIG. 35A shows a front view of a further tension band;

FIG. 35B shows a plan view of the tension band as per FIG. 35A;

FIG. 35C shows a perspective view of the tension band as per FIG. 35A;

FIG. 38A shows a front view of a further band connector with inserted tension band;

FIG. 38B shows a plan view of the subject matter from FIG. 38A;

FIG. 38C shows a perspective view of the subject matter from FIG. 38A;

FIG. 38D shows a further perspective view of the subject matter from FIG. 38A;

FIG. 39A shows a front view of the band connector with inserted tension band as per FIG. 38A with a further connector;

FIG. 39B shows a plan view of the subject matter from FIG. 39A;

FIG. 39C shows a perspective view of the subject matter from FIG. 39A;

FIG. 39D shows a further perspective view of the subject matter from FIG. 39A;

FIG. 40A shows a front view of a band connector with inserted tension band with a further connector;

FIG. 40B shows a plan view of the subject matter from FIG. 40A;

FIG. 40C shows a perspective view of the subject matter from FIG. 40A;

FIG. 40D shows a further perspective view of the subject matter from FIG. 40A;

FIG. 41A shows a front view of a further connector with inserted tension band;

FIG. 41B shows a plan view of the subject matter from FIG. 41A;

FIG. 41C shows a perspective view of the subject matter from FIG. 41A;

FIG. 41D shows a further perspective view of the subject matter from FIG. 41A;

FIG. 42A shows a front view of a band connector with inserted tension band with a further connector;

FIG. 42B shows a plan view of the subject matter from FIG. 42A;

FIG. 42C shows a perspective view of the subject matter from FIG. 42A;

FIG. 42D shows a further perspective view of the subject matter from FIG. 42A;

FIG. 43A shows a front view of a band connector with inserted tension band with a further connector;

FIG. 43B shows a plan view of the subject matter from FIG. 43A;

FIG. 43C shows a perspective view of the subject matter from FIG. 43A;

FIG. 43D shows a further perspective view of the subject matter from FIG. 43A;

FIG. 43E shows a sectional side view of the subject matter from FIG. 43A;

FIG. 44A shows a perspective view of a partially illustrated further connector according to an exemplary embodiment;

FIG. 44B shows a side view of the connector as per FIG. 44A;

FIG. 44C shows a sectional side view of the subject matter from FIG. 44A;

FIG. 44D shows a plan view of the subject matter from FIG. 44A;

FIG. 45 shows a perspective view of the connector from FIG. 44A;

FIG. 46 shows a perspective view of a bracket as per FIG. 44A;

FIG. 47A shows a perspective view of a partially illustrated further connector according to an exemplary embodiment;

FIG. 47B shows a side view of the connector as per FIG. 47A;

FIG. 47C shows a sectional side view of the subject matter from FIG. 47A;

FIG. 47D shows a plan view of the subject matter from FIG. 47A;

FIG. 48 shows a perspective view of the connector from FIG. 47A;

FIG. 49 shows a perspective view of a bracket as per FIG. 47A;

FIG. 50A shows a plan view of a connecting unit with two elastic elements with in each case one terminating element integrated into the connecting unit according to an exemplary embodiment of the invention;

FIG. 50B shows a perspective view of the connecting unit as per FIG. 50A;

FIG. 50C shows a partial side view of a detail of the connecting unit as per FIG. 50A;

FIG. 51 shows a perspective view of the integrated terminating element of the connecting unit as per FIG. 50A;

FIG. 52A shows a side view of partially illustrated connecting units as per FIG. 50A with an inserted band;

FIG. 52B shows a sectional side view of the subject matter from FIG. 52A;

FIG. 52C shows a perspective view of the subject matter from FIG. 52A;

FIG. 53A shows a perspective view of a partially illustrated further connector according to an exemplary embodiment;

FIG. 53B shows a perspective exploded view of three parts of the subject matter as per FIG. 53A;

FIG. 54A shows a side view of a partially illustrated connecting unit as per FIG. 53A with an inserted band;

FIG. 54B shows a sectional side view of the subject matter from FIG. 54A;

FIG. 54C shows a plan view of the subject matter from FIG. 54A

Figure 55A:
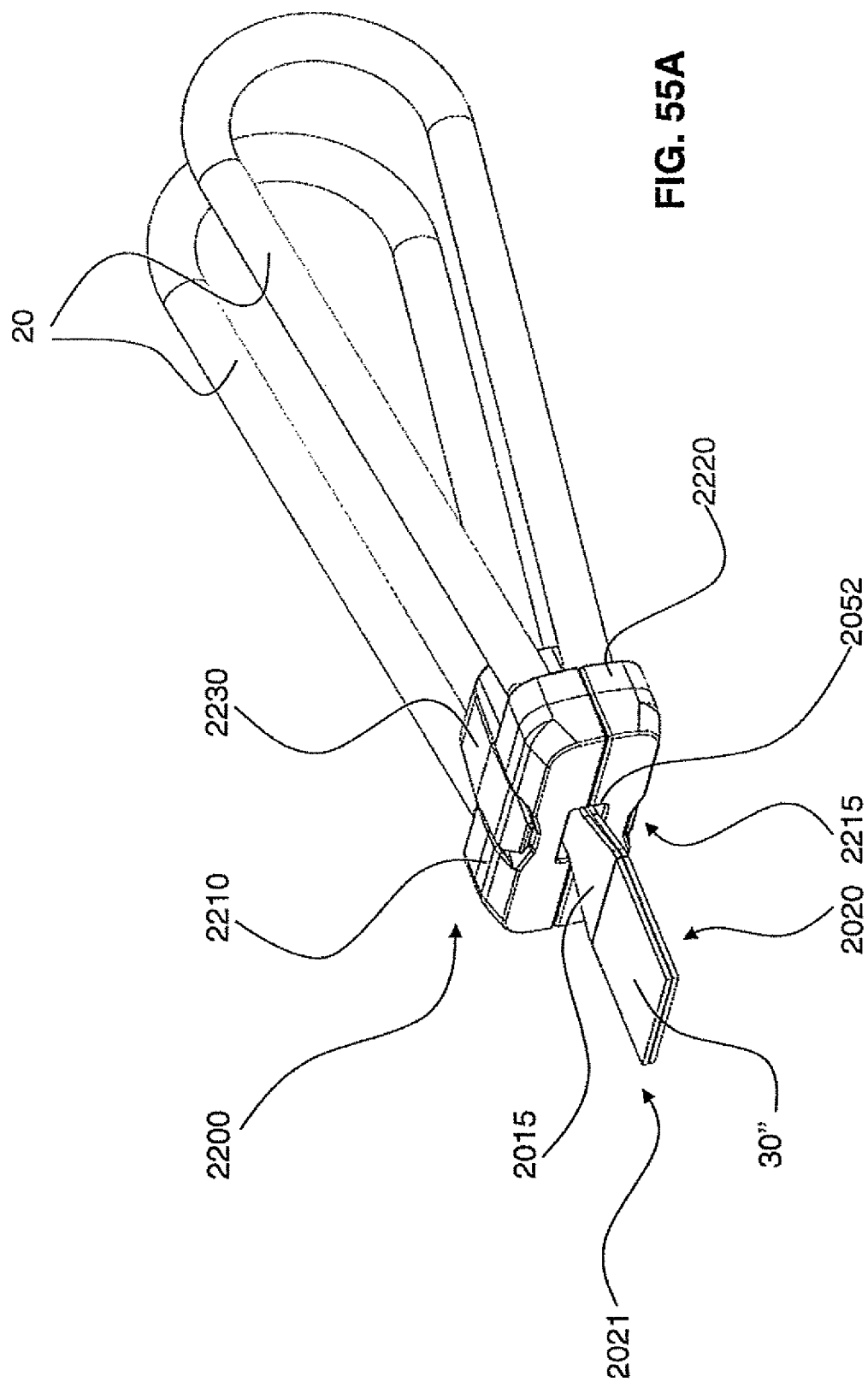
Figure 55B:
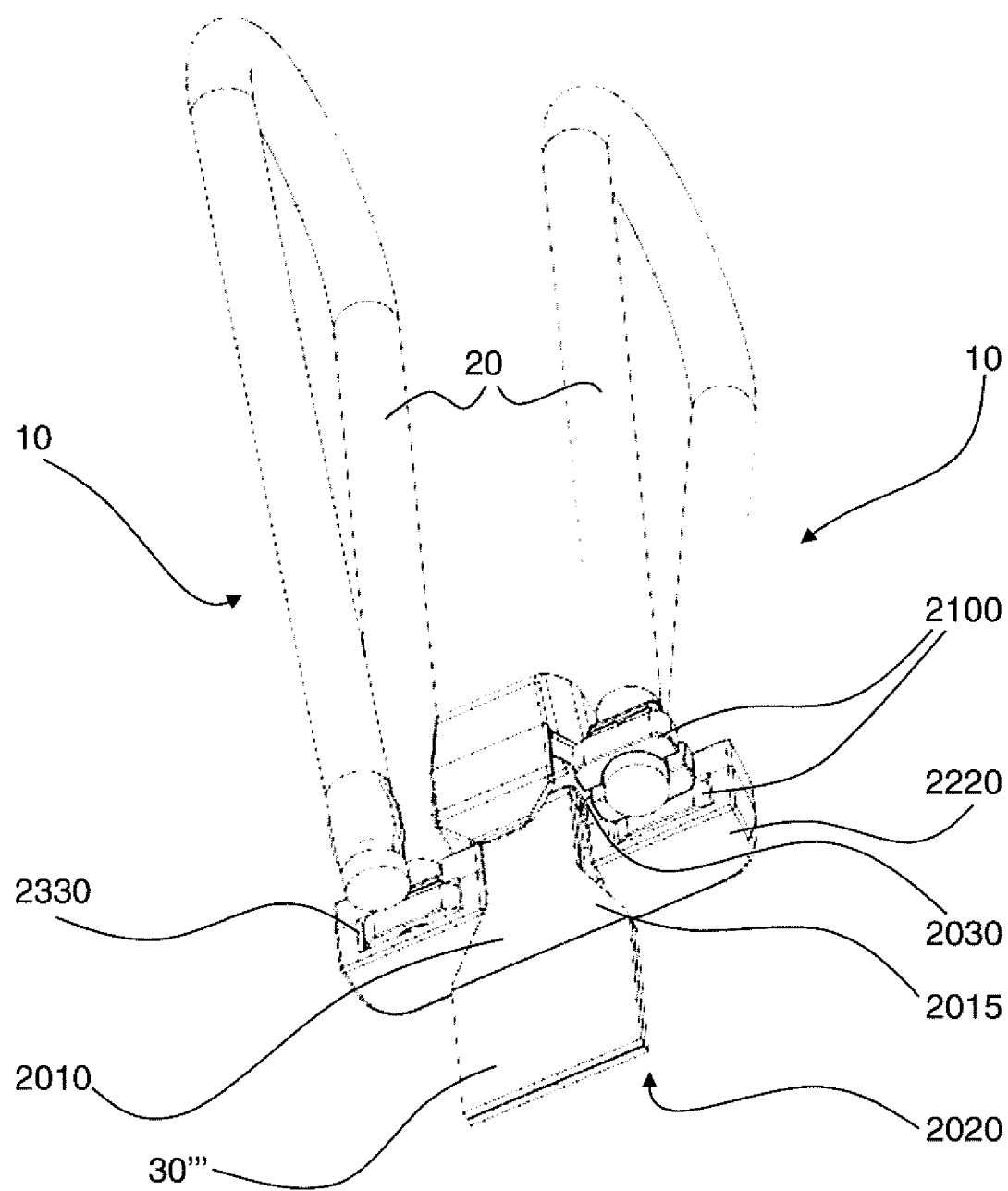
Figure 58:
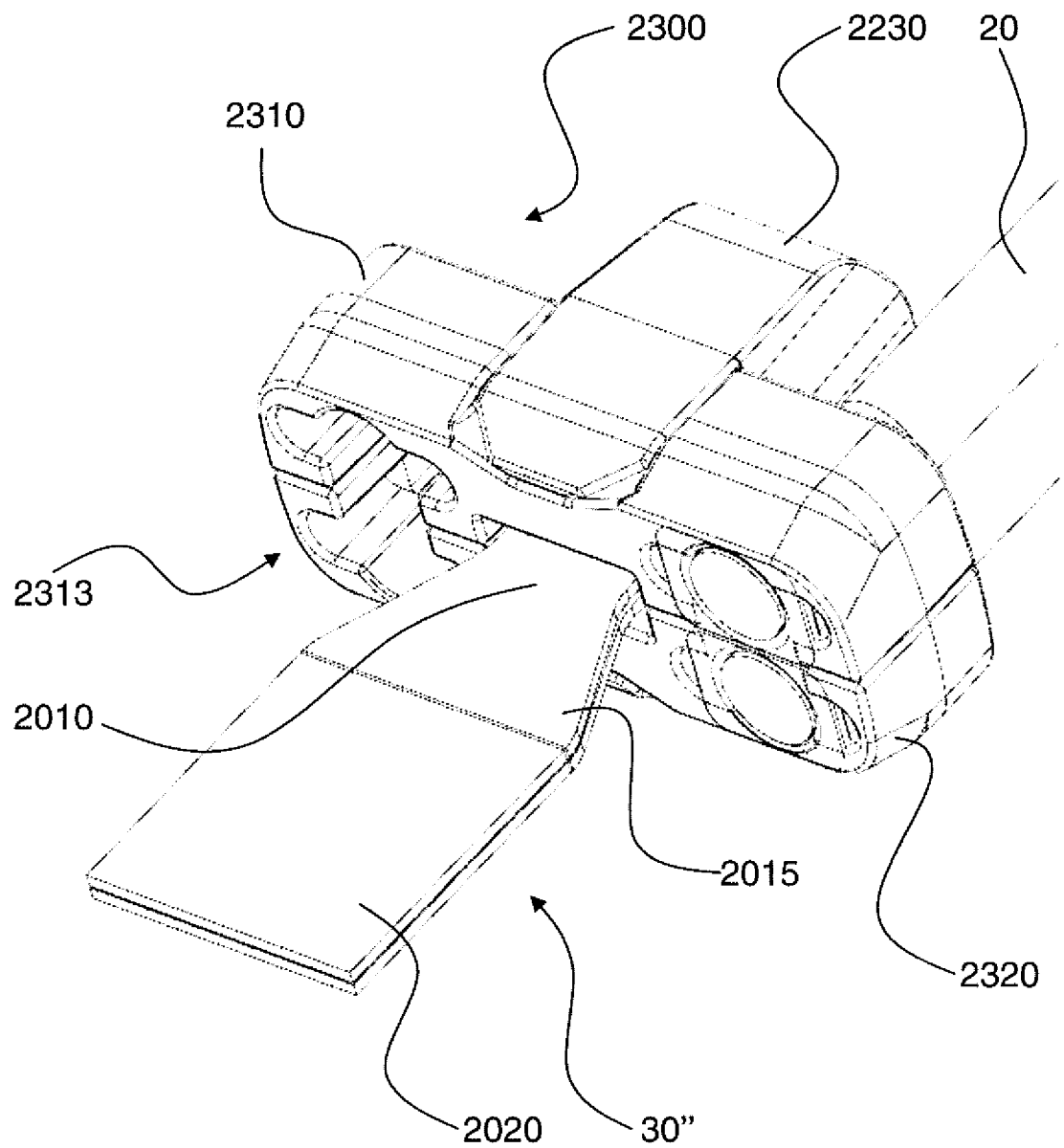
Figure 59A:
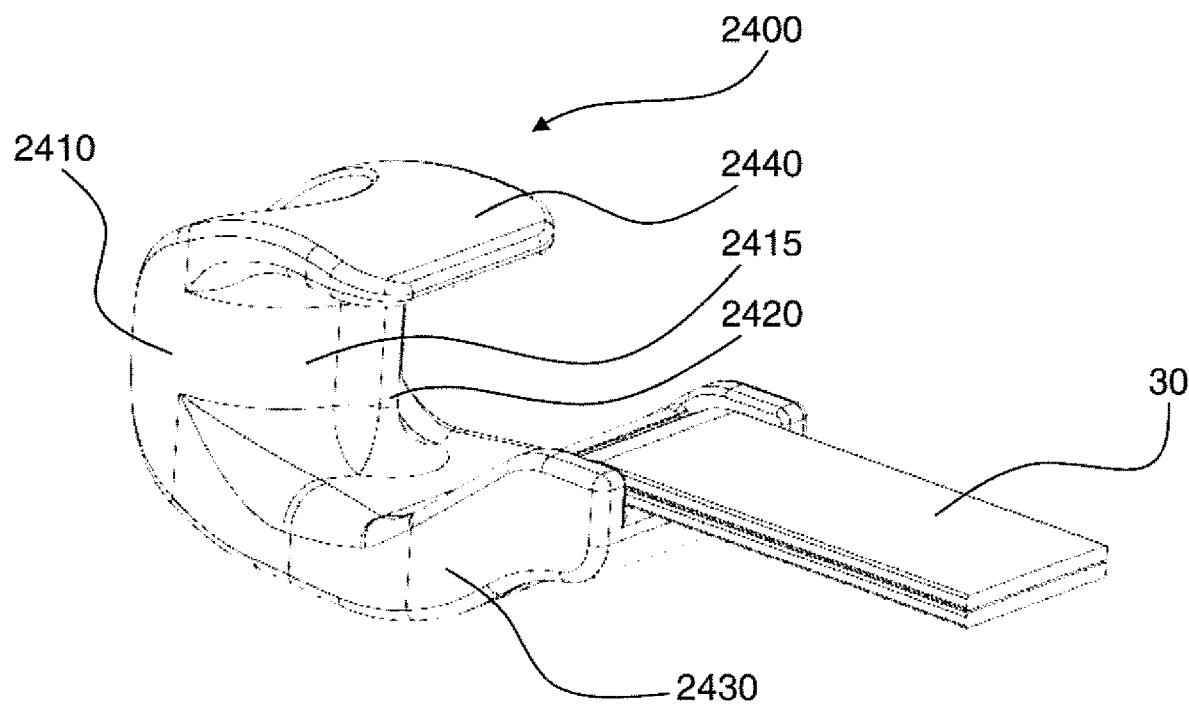
Figure 59B:
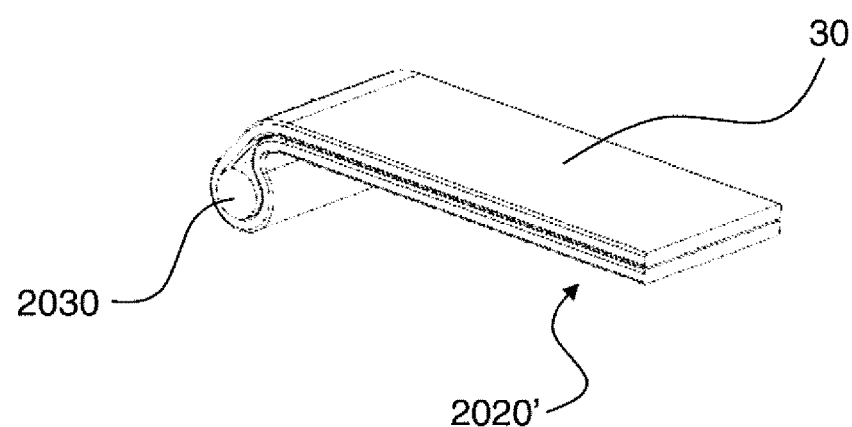
Figure 60A:
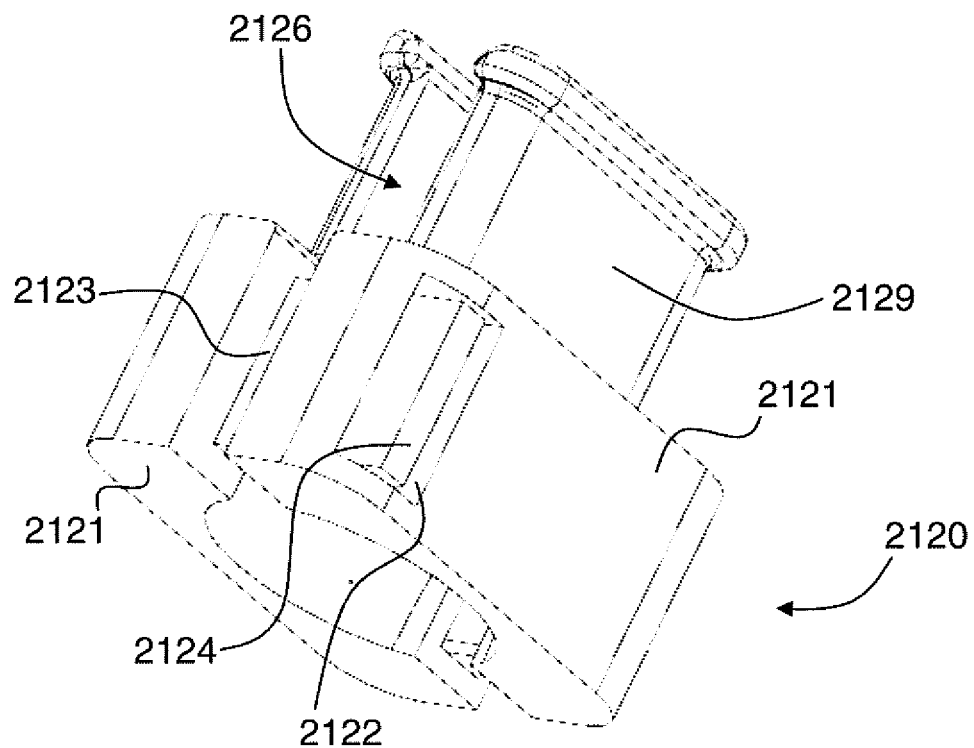
Figure 60B:
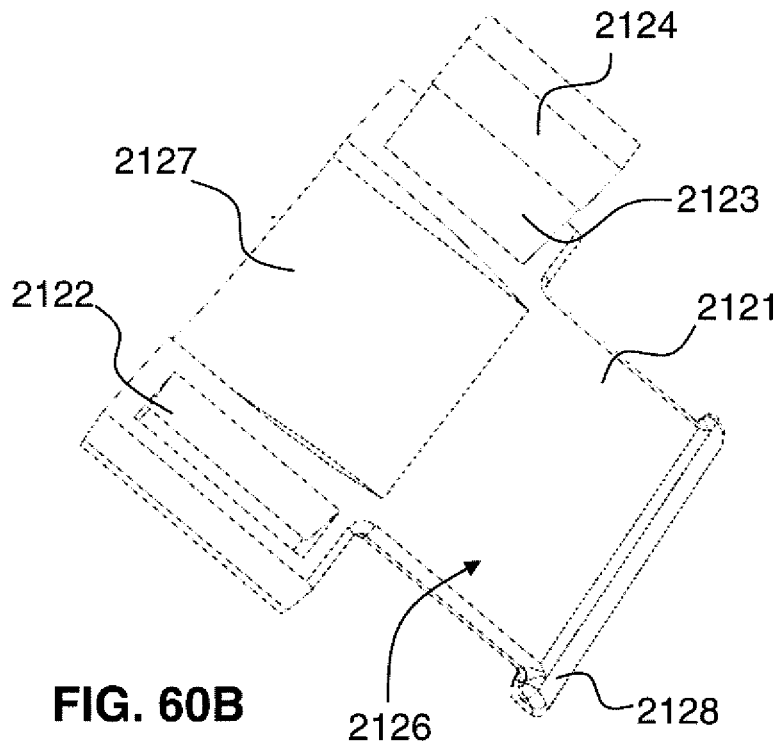
Figure 61A:
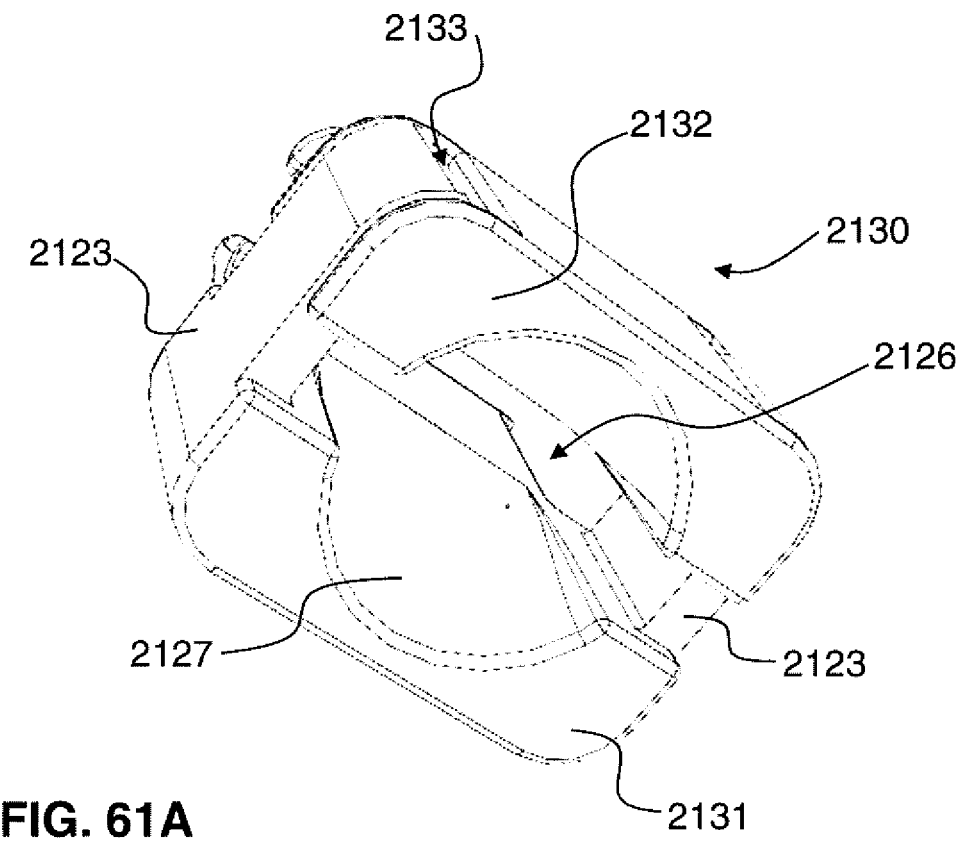
Figure 61B:
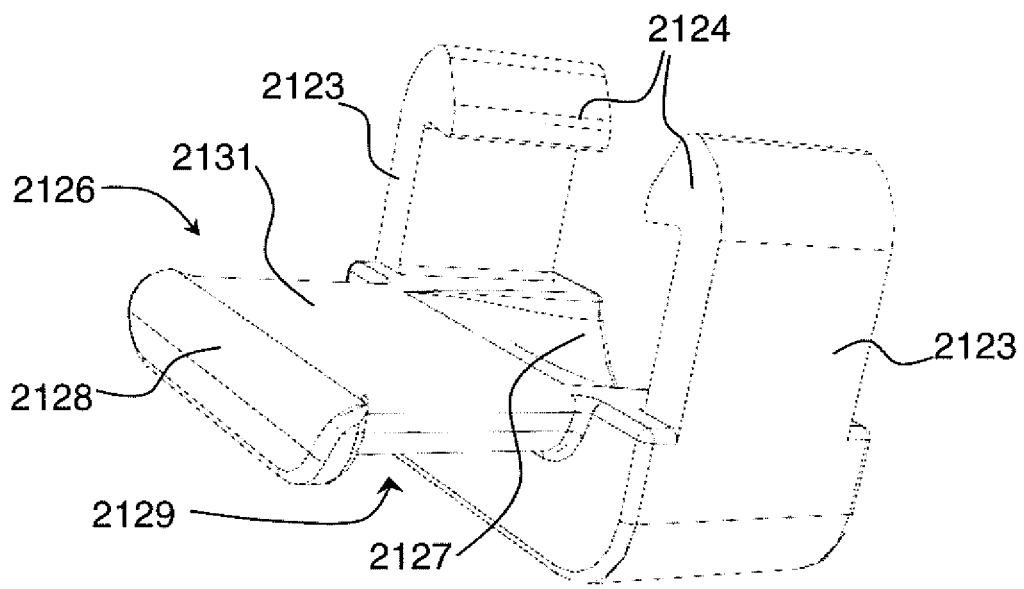
Figures 62B, 63B, 64B:
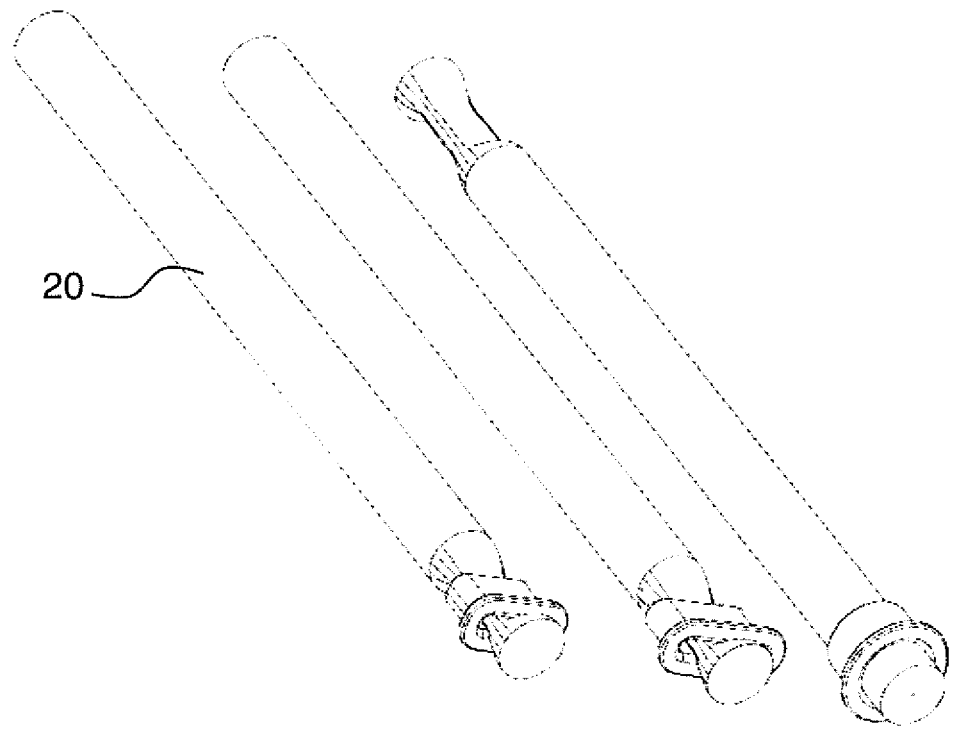
Figures 62A, 63A, 64A:
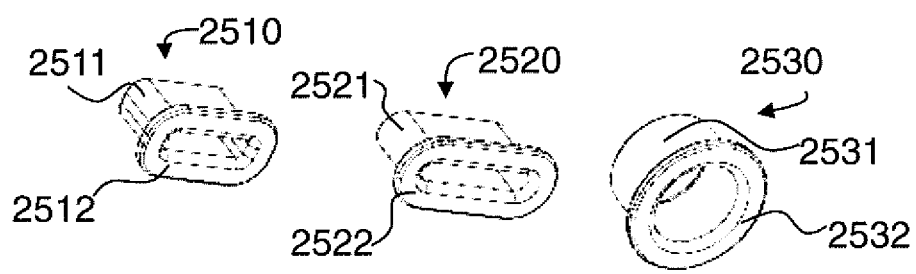
Figures 65B, 66B, 67B:
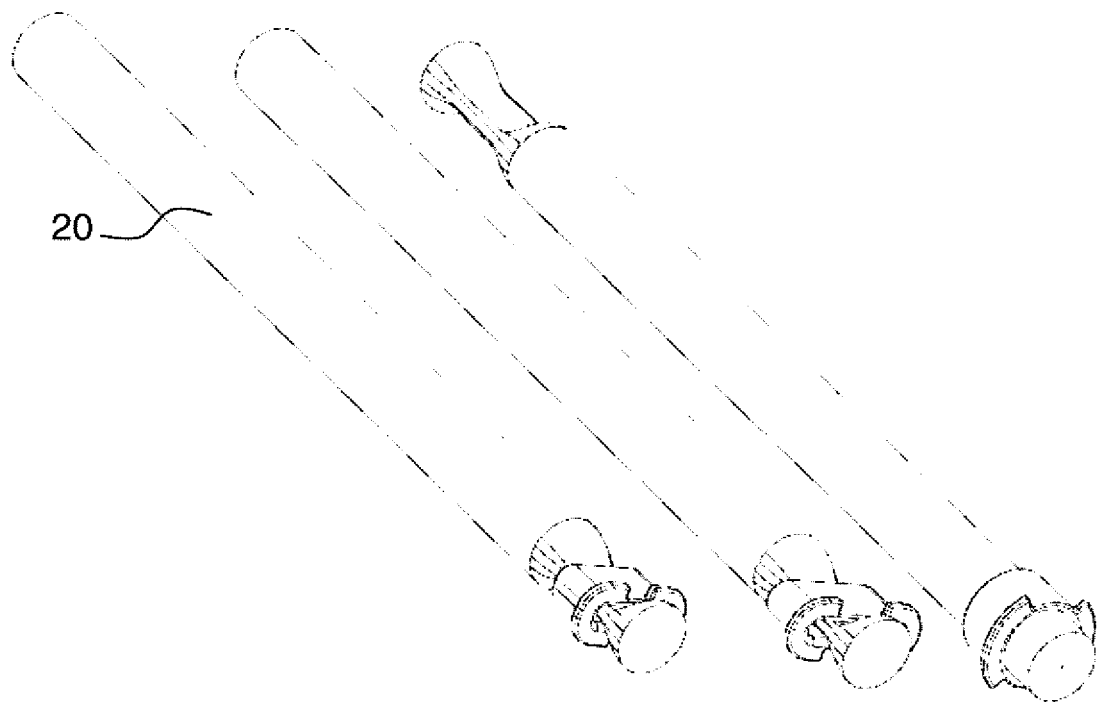
Figures 65A, 66A, 67A:
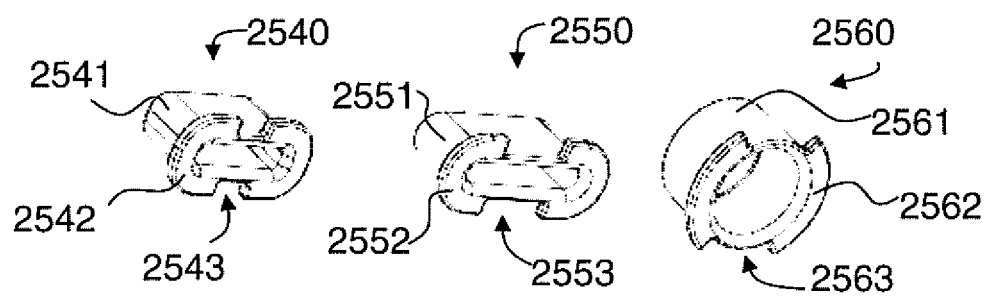
Figure 68A:
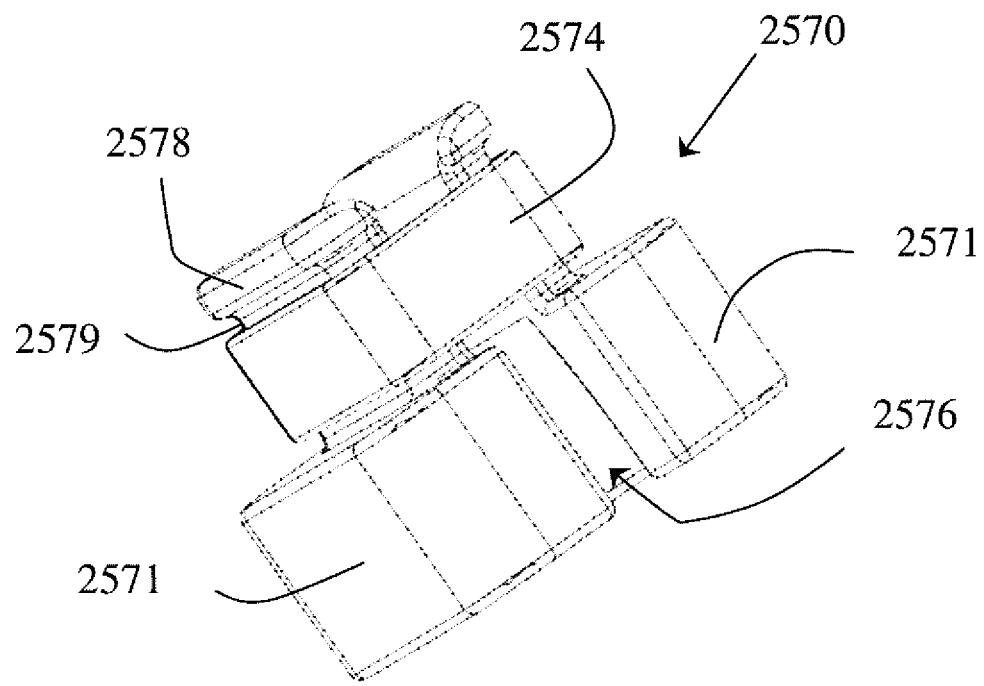
Figure 68B:
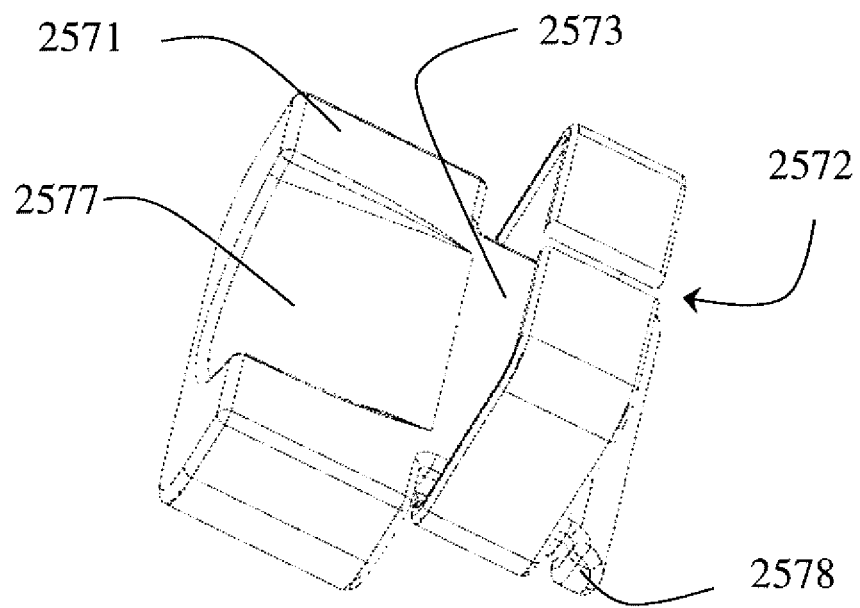
Figure 69A:
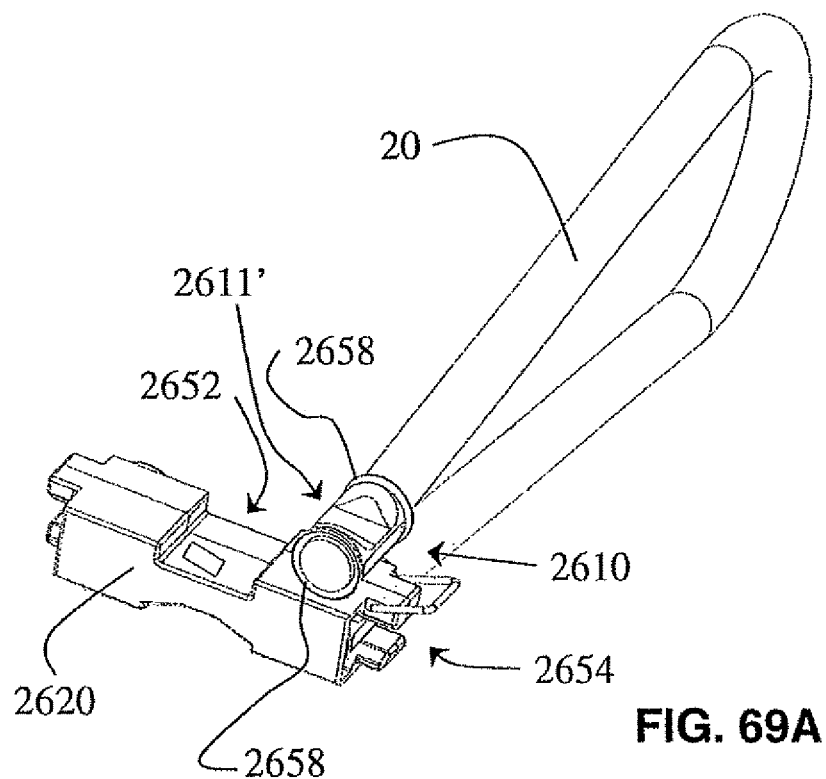
Figure 69B:
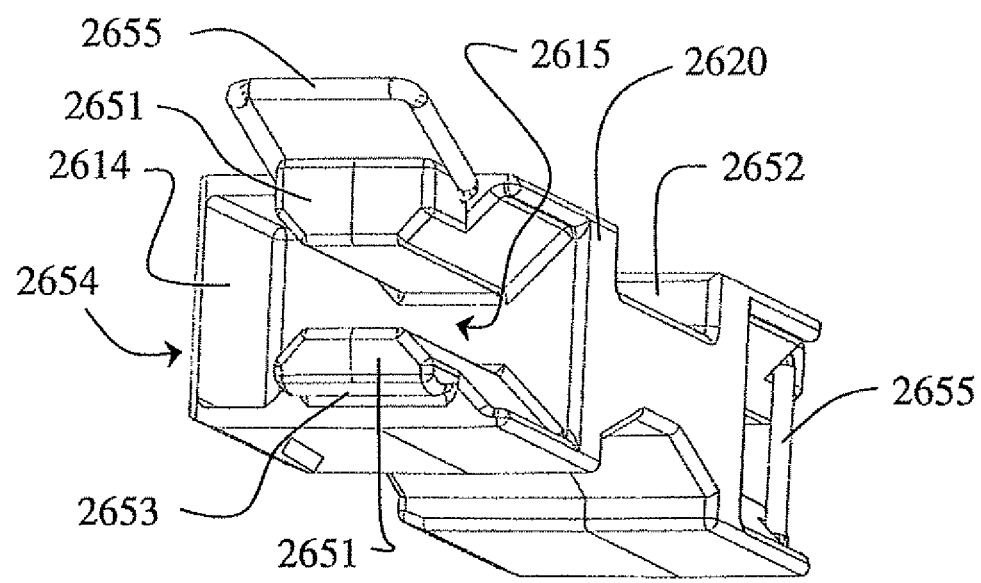

FIG. 55A shows a perspective view of a short connecting unit with two elastic elements shaped to form a loop, and with a tension band mounted into the connecting unit, similar to that as per FIG. 35;

FIG. 55B shows a perspective view from above of the lower part of the connecting unit as per FIG. 55A with elastic elements and tension band;

FIG. 56A shows a perspective view of a further terminating element according to an exemplary embodiment of the invention in the open state on a flexible cord element;

FIG. 56B shows a perspective view of the terminating element as per FIG. 56A in the closed state on and with a flexible cord element;

FIG. 57 shows a perspective view of a lower part of a longer connecting unit than that from FIG. 55B, with openings for the insertion of terminating elements of cord elements;

FIG. 58 shows a perspective view of a further connecting unit with an elastic element shaped to form a loop and with a tension band mounted into the connecting unit, similar to that as per FIG. 35;

FIG. 59A shows a perspective view of a further connecting unit for one or two elastic element(s) shaped to form a closed loop and with an inserted tension band, similar to that as per FIG. 34;

FIG. 59B shows a perspective view of the tension band as per FIG. 59A with a retention bar;

FIG. 60A shows a perspective view of a two-part terminating element according to an exemplary embodiment of the invention;

FIG. 60B shows a perspective view of one of the two identical terminating element parts as per FIG. 60A;

FIG. 61A shows a perspective view of a two-part terminating element according to an exemplary embodiment of the invention;

FIG. 61B shows a perspective view of the terminating element part as per FIG. 61A with clamping hooks;

FIG. 62A shows a perspective view of a further terminating element in the closed state;

FIG. 62B shows a perspective view of the terminating element as per FIG. 62A in the closed state on and with a flexible cord element;

FIG. 63A shows a perspective view of a further terminating element in the closed state with laterally protruding regions in relation to the embodiment of FIG. 62A/B;

FIG. 63B shows a perspective view of the terminating element as per FIG. 63A in the closed state on and with a flexible cord element;

FIG. 64A shows a perspective view of the terminating element as per FIG. 63A in the open state;

FIG. 64B shows a perspective view of the terminating element as per FIG. 64A in the open state on and with a flexible cord element;

FIG. 65A shows a perspective view of a further terminating element similar to the terminating element as per FIG. 62A/B with interrupted flange in the closed state;

FIG. 65B shows a perspective view of the terminating element as per FIG. 65A in the closed state on and with a flexible cord element;

FIG. 66A shows a perspective view of a further terminating element similar to the terminating element as per FIG. 63A/B with interrupted flange in the closed state and with laterally protruding regions in relation to the embodiment as per FIG. 65A/B;

FIG. 66B shows a perspective view of the terminating element as per FIG. 66A in the closed state on and with a flexible cord element;

FIG. 67A shows a perspective view of the terminating element as per FIG. 66A in the open state;

FIG. 67B shows a perspective view of the terminating element as per FIG. 67A in the open state on and with a flexible cord element;

FIG. 68A shows a perspective view of a further two-part terminating element with an additional metal ring with fixing action;

FIG. 68B shows a perspective view of the lower part of the terminating element as per FIG. 68A with the metal ring;

FIG. 69A shows a perspective view of a lower part of a further connecting unit with an elastic element shaped to form a loop and with a terminating element, inserted laterally into the connecting unit, of the elastic element with hoop fastener;

FIG. 69B shows a perspective view, obliquely from the rear and from below, of the connecting unit as per FIG. 69A without inserted terminating element FIG. 70A shows a perspective view of a further two-part terminating element composed of two metal parts;

FIG. 70B shows a perspective view of a further two-part terminating element composed of a metal part and a central plastics part; and FIG. 70C shows a perspective view of a further two-part terminating element composed of a metal part and a central plastics part with a flange.

DESCRIPTION OF PREFERRED EMBODIMENTS

Preferred embodiments of the present invention will now be described on the basis of the figures. FIG. 1 shows a perspective view of an elastic element 10 composed of a flexible cord element 20 with two free ends 21, of which only one free end 21 is illustrated in FIG. 1, and with a terminating element 100 according to an exemplary embodiment of the invention. The elastic element 10 is in this case inserted in a connector 200 (illustrated by dashed lines), various embodiments of which will be described as connecting elements further below.

The flexible cord element 20 may be a rubber band, an elastic cord, a single-core or multi-core elastomer strand, or a cord which is composed of multiple filaments with a woven sheath and with a woven or hose-like casing. In particular, said flexible cord element exhibits corresponding flexibility under tensile load, and is capable of stretching in a longitudinal direction by at least 50 percent, in particular 50 to 150 percent. For applications with higher desired elasticity constants, the characteristic of the cord may also be stiffer. Such a cord is provided for example for the securing of a jump mat to a trampoline frame, as is known from WO 2011/032173.

FIG. 2 shows the terminating element 100 without an inserted flexible cord element 20. FIG. 4 shows the terminating element 100 for example as a plastics injection-molded part before it is bent into the closed form with which it clamps the elastic band 10. The terminating element 100 has a central rear wall 107 with, on both sides, a transition, provided in each case by bending or in the manner of a film hinge depending on material selection, into the clamping region 101 in which, in the clamped state, two internally situated clamping surfaces 102 are situated opposite one another at a predefined distance. The reference designation 103 denotes the free space behind the clamping body 101 and in front of the rear wall 107, in front of which the free end 21 of the cord 20 or elastic element then comes to lie. In the zone 103, the free end 21 of the cord 20 compressed and deformed in the clamping region 101 can expand to its original dimension again.

FIG. 3 shows a further exemplary embodiment of a terminating element 110, which is designed similarly to the terminating element 100, with the difference that the clamping surface 102 is designed as a toothed clamping surface 112 in order to hold the flexible cord element 20. It can be seen in the exemplary embodiments as per FIGS. 1 to 4 that the height of the rear wall 107 with the bending film hinges is taller than the front side 108 of the terminating element 100 or 110, such that the outer sides 109 taper toward one another in a narrowing manner on the flexible cord element 20. With a complementarily designed opening 203 (see inter alia FIG. 23A), the clamping of the terminating element 110 on the flexible cord element 20 can then be improved, and the seat of the elastic element 10 in the receptacle 200.

FIG. 5 shows a further exemplary embodiment of an elastic element 10 with a terminating element 120, in the case of which the flexible cord element 20 also again projects with its free end 21 into the receiving space 123. By contrast to the exemplary embodiments mentioned above, in this case, the clamping body as per FIG. 6 has a transversely lying rib 121 which is arranged opposite a complementary clamping groove 121'. Here, the front sides 128 taper toward the inner side of the terminating element 120, wherein it is however likewise the case here that the narrowing characteristic of the outer sides is realized.

FIG. 7A shows a perspective view of a two-part terminating element 130 according to an exemplary embodiment of the invention in the open state. This involves punched and preformed parts composed of metal strip. FIG. 7B shows a perspective view of the two-part terminating element 130 as per FIG. 7A in the closed state without an inserted flexible cord element 20. FIG. 7C, which belongs to this exemplary embodiment, finally shows a perspective view of two two-part terminating elements 130 as per FIG. 7A in the closed state with a flexible cord element 20 shaped to form a loop (only partially illustrated). FIG. 7C thus shows, in part, a complete elastic element 10.

The terminating element 130 is composed of a clamp 131 and of a U-shaped securing bracket 132. The clamp 131 is, similarly to the terminating elements 100 or 120, equipped with a rear wall 137, proceeding from which, substantially in the closed state, externally situated side 139 extending parallel are formed. From these, to the free ends of the clamp 131, there extends clamping grooves 133 directed inward toward the band 20 to be inserted, which clamping grooves then in turn end at a free end 134 corresponding to a U. Said grooves 133 in the element 131 make it possible here for the bracket 132 to be placed from below or above into the lower or upper of the grooves 133, and for the free ends 135 of the bracket 132 to be pushed toward one another, in order to then bring said free ends 135 into aligned portions which are parallel to the U-shaped base of the element 132, such that here, the U-shaped grooves 133 are pressed toward one another and, here, clamp and deform the elastic band 20 placed in between, and prevent the free end 21 of the band 20 from being pulled back out of the receiving space 133.

FIGS. 8A to 8C show a further exemplary embodiment of a terminating element 140 with a two-part design, comprising a clamp 141 and a bracket 142. In all of the drawings of the present description, similar features are denoted by similar reference designations, such that here, the rear wall 147 transition into the forwardly directed free ends 144, which rear wall, by means of the inwardly directed clamping grooves 143 with then outwardly bent free ends 144, then performs the same function as the corresponding features of the exemplary embodiment as per FIGS. 7A to 7C. The difference here lies in the fact that the rear wall 147 has two flanges 148 which project upward and downward beyond the top side 149 and bottom side respectively, which flanges can then enter into a form fit with the connector 200 mentioned later in the description. FIG. 8C then shows the elastic element 10 composed of the flexible cord element 20 and the terminating element 140 at the respective free ends 21 and 22 of the flexible cord element 20.

FIGS. 9A to 9C show a further terminating element 150, in the case of which the rear wall 157 is, similarly to the rear wall 147, illustrated in a slightly bent-open position (by means of central double line) in the open state of the connector, and, without a flange, corresponds to the embodiment of FIG. 8.

In the exemplary embodiment as per FIG. 7A, the rear wall 137 protrudes in each case to the right and to the left laterally beyond the otherwise truncated or punched-out tabs of the clamp 131. In FIG. 8A, this lateral protrusion corresponds to the protrusion of the flanges 148 at the top and bottom, such that in these exemplary embodiments, a form fit with a shoulder in relation to the connector 200 can also be realized, whereas the exemplary embodiment as per FIG. 9 makes do without such protruding elements, and the connection can be realized by means of a self-reinforcing clamping fit.

FIGS. 10A to 10C show a further exemplary embodiment of a terminating element 160, which, by contrast to the terminating elements described immediately above, is of single-piece design. Here, the clamp 161, with the one central part of the rear wall 167 formed perpendicular to the flexible cord element 20 to be inserted and two further partial portions of the rear wall 167 pointing slightly away from the flexible cord element 20, is in turn equipped with the clamping grooves 163, which end at the free ends 164. What is different here is that, in the lower clamping groove 163, bracket lugs 162 are provided which protrude laterally to the left and to the right and which are bent with their free ends 165 toward one another and which engage into the upper clamping groove 163 so as to engage around the upper portion, in order to then likewise come to lie in a parallel orientation with respect to one another.

FIGS. 11A to 11C, FIGS. 12A to 12C, FIGS. 13A to 13C, FIGS. 14A to 14C, FIGS. 15A to 15C, FIGS. 16A to 16C and FIGS. 17A to 17C show in each case a front view of a terminating element 1110, 1120, 1130, 1140, 1150, 1160, 1170, a perspective view prior to the clamping, and a further perspective view after the clamping on the elastic band 20 has been performed. In part, as noted in the brief description of the drawings, the drawings illustrate the individual elements in some cases as an exploded drawing and in some cases in assembled form, for example in FIG. 11A, FIG. 11B, FIG. 11C, FIG. 12A, FIG. 12B, FIG. 13A, FIG. 13B, FIG. 13C, FIG. 16B and FIG. 17B.

In the exemplary embodiment as per FIGS. 11A to 11C, the terminating element 1110 has a circular-segment-shaped inner clamping body 1111 which is placed in from above and below or which is integrated into the terminating element in unipartite fashion and which then compresses the flexible cord element 20 and thus clamps the latter. The ring is pushed over the rubber cord into its final position (upper drawing of FIG. 11C). There, the rubber cord is intensely compressed from the end side using a tool. At the same time, from the cord tension length side, two circular-segment-shaped elements 1121 are fired into the empty spaces that arise as a result of the compression above and below the clamping zone. As the clamping tool is retracted, the elements 1121 become jammed together with the ring and thus give rise to the required clamping and deformation.

In the exemplary embodiment as per FIGS. 12A to 12C, the ring 1110 has the form of a classic 2-ear clamp 1120 with in each case one protruding rib 1128 at the top and at the bottom, which, after the compression for the reduction of the ring circumference, corresponds in terms of function to a protruding flange portion. Before the clamping of the two ribs 1128, two circular-segment-shaped clamping elements 1121 are, as described above, pressed in from the tension length side of the cord. The clamping elements 1121 intensify the deformation of the elastic strand 20.

In the exemplary embodiment as per FIGS. 13A to 13C, said 2-ear clamp flange portions 1138 are arranged in each case laterally to the left and to the right and are thus situated so as to be situated opposite and parallel to the inserted or integrated inner clamping bodies 1131. In order that the rubber cord or its sheath cannot be laterally clamped and damaged during the clamping process, the circular-segment-shaped inner clamping bodies 1131 have in each case one arcuate projection 1139 which, during the compression, is displaced into a corresponding recess on the opposite inner clamping body and thus prevents the rubber from drifting away laterally. For this purpose, the inner clamping body 1131 is illustrated in FIG. 13B with its lateral protruding edges and with the projection 1139 in an exploded view and in an assembled state, and in FIG. 13C with two rubber cords one above the other, in one case with inner clamping bodies 1131 arranged over the clamping point and in one case in the closed state.

In the exemplary embodiment as per FIGS. 14A to 14C and FIGS. 15A to 15C, the ring 1140 or 1150 is larger than the diameter of the flexible cord element 20 to be inserted, and said ring is flattened by exertion of pressure on its top side 1149 and bottom side, such that the ring is formed into two opposite parallel surfaces with lateral protruding ribs 1148 and 1158, which in turn have flange functions. Here, the ring 1150 has a larger diameter than the ring 1140, such that lateral regions 1158 which result from the clamping protrude further beyond the flexible cord element 20 than the lateral regions 1148. The difference between the exemplary embodiments of FIG. 14 and FIG. 15 lies in the respective size of the ring.

FIGS. 16A to 16C show a ring 1160 which, similarly to the examples mentioned above, has been compressed into an oval shape, as can be seen in the second perspective view from the rear in FIG. 16B, with the protruding ribs 1168 being formed. Here, however, after the removal of the side parts, a rear-side top side 1169 then remains which is oriented in the direction of the flexible cord element 20. On the bottom side, a corresponding surface is provided which protrudes in the direction of the flexible cord element 20. In the case of this configuration, in the flanges which protrude on both sides in the direction of the tension length of the cord, in each case the outer corners are punched out during the clamping process. The cord thus remains covered, whereas slightly recessed stops are formed at the end corners of the flanges. The corresponding receiving and abutment surfaces in the connector are designed such that the projecting cord cover projects beyond the outer edge of the connector, and thus no direct contact occurs between connector and cord during intended use of the trampoline.

The exemplary embodiment as per FIGS. 17A to 17C involves 2-ear clamps with filled ear zones 1171, which correspond to functional inner clamping bodies. These are situated on both sides of the terminating element 1170 and are shaped to form corresponding protruding solid ribs 1178, wherein a small cavity is formed between the pinched rubber cord and the ribs 1178. The rear side 1179 protruding in the direction of the band 20 furthermore also has, after the compression of the ring, folded lateral walls 1177 composed of the ring material.

FIGS. 18A and 18B show a plan view of two elastic elements 10 each with terminating elements 100 at their opposite free ends, which terminating elements have been inserted pairwise into corresponding connectors 200. The overall result is thus a connecting unit 15 with two elastic elements 10 with in each case one further terminating element 100 according to an exemplary embodiment of the invention, inserted into two connectors or connecting elements 200. A relatively large central hole 202 oriented to the band side is provided, said hole forming a second receptacle, being adjoined by an inner shoulder which defines the relatively small opening 201 that receives the through-extending band 30 which is retained by the retaining element 340 as shown in FIG. 19B. Laterally with respect thereto to the left and to the right, there are situated the openings 203 which widen conically from the side visible in FIG. 23A and forming the first receptacles.

As shown in FIG. 18B, the connectors 200 are cuboidal elements with two laterally provided through-extending holes 203 through which the flexible cord elements 20 are led before the terminating elements 100 are fitted onto the flexible cord element 20. Then, as a result of the previously fitted connectors 200 being pushed one inside the other, by means of the resulting form fit and force fit from the terminating elements 100 which taper in narrowing fashion, the possibility is utilized of introducing these elements without lateral openings into the connectors 200. For this purpose, the diameter of the terminating elements (for example from FIGS. 11 to 17) is, in corresponding exemplary embodiments, at least partially larger than that of the flexible cord element 20. It must be stated that the flexible cord element 20 is in this case illustrated as being circular in cross section. In other exemplary embodiments, this may be oval, elliptical or flat.

In another exemplary embodiment, it is possible for the connectors 200 to be equipped laterally with through-extending slots for the purposes of introducing the elastic elements 10 laterally, as illustrated in FIG. 13 of WO 2011/032173 A1. In the center of the connector 200, parallel to the through openings for the elastic elements 20, there is inserted a further passage channel running parallel thereto, which passage channel, on the internally situated side, has a larger opening 202 than the outwardly directed opening 201. These in each case through-extending passages, which are kept parallel to the openings of the flexible cord elements 20, will become clearer in conjunction with the description of FIGS. 19A and 19B.

There, FIG. 19A shows a side view of the connecting unit as per FIG. 18A with flexible cord elements 20 shaped to form a loop and with two tension bands 30 mounted into the connecting units 200. The tension bands may in particular be double-layer bands 30 led back in particular in a U shape as a loop, which bands are held in the relatively large opening 202 by virtue of a blocking stem 340 acting as a retaining element being inserted in the relatively large free space resulting from the U of the loop, which blocking stem 340 may be supported in particular in corresponding guide grooves of the opening 202 forming the second receptacle. Said elements may also be correspondingly adhesively bonded or plastics-welded in the connector 200. The blocking stem corresponds, in the exemplary embodiments described further below, to the band connector 340 loosely inserted there. Functionally, the stem is also, under tensile load, similar to the retaining element formed by the inner cylinder 371 of the clip 370.

Figure 20A:
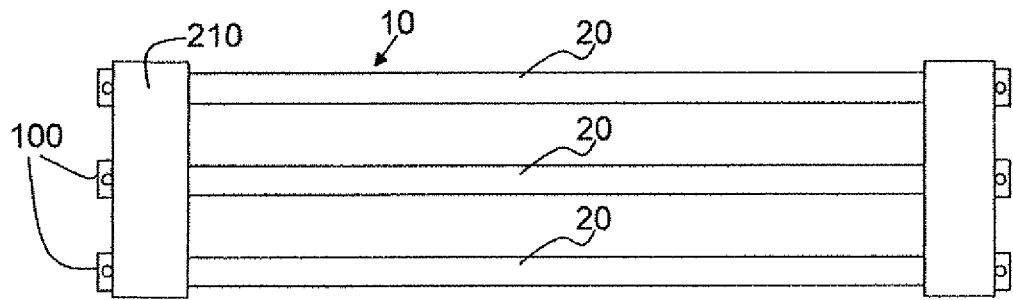
FIG. 20A shows a plan view of a connecting unit with three elastic elements with in each case one further terminating element according to an exemplary embodiment of the invention, inserted into two connecting elements.
Figure 20B:
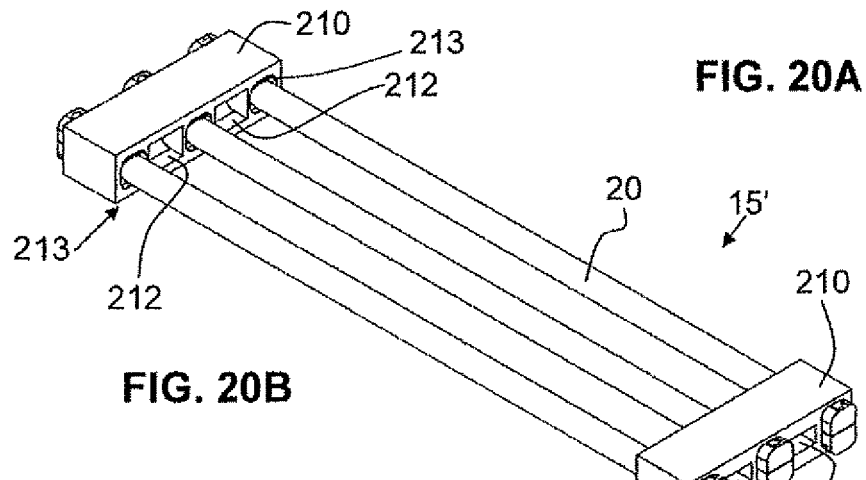
FIG. 20B shows a perspective view of the connecting unit as per FIG. 20A.

FIGS. 20A and 20B show an exemplary embodiment of a connecting unit 15' similar to FIGS. 18A and 18B, wherein in this case three flexible cord elements 20 are arranged adjacent to one another. These are also again equipped with the terminating element 100, which are inserted into modified connectors 210, because said connector 210 has in each case three through-extending openings 213 for the flexible cord elements 20, between which openings there are then provided in each case two openings 211 and 212 for the leadthrough of two bands 30 which are retained by retaining element 340.

The side view in FIG. 20A of the connecting unit with flexible cord elements 20 shaped to form a loop and with two tension bands 30 mounted into the connecting units 200 will be described further below in conjunction with FIG. 37.

Figure 21A:
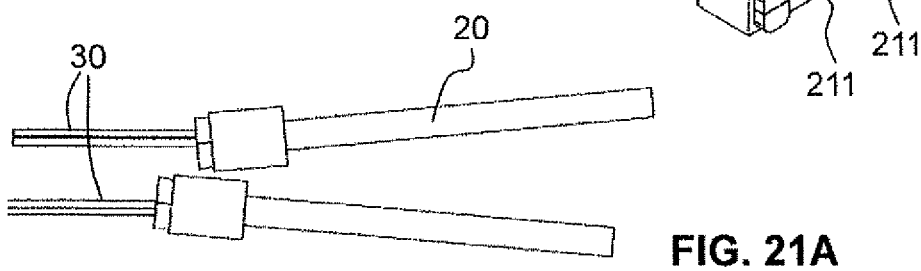
FIG. 21A shows a side view of the connecting unit as per FIG. 18A with two elastic elements and two tension bands mounted into the connecting units.
Figure 21B:
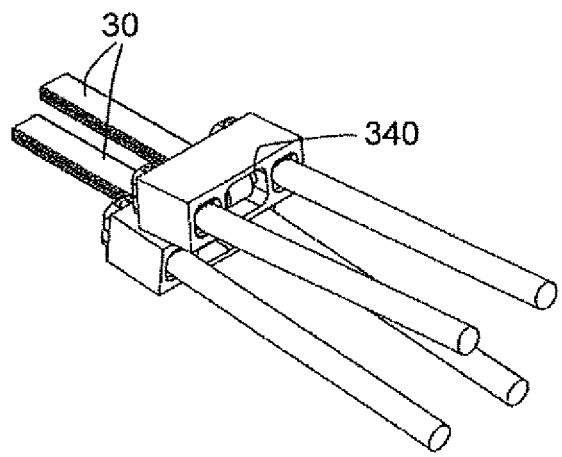
FIG. 21B shows a perspective view of the connecting unit as per FIG. 18A.

FIG. 21A and FIG. 21B show a similar view to FIG. 19A and FIG. 19B respectively as embodiment of FIG. 18A. In general, the connectors 200 come to lie one over the other, though may also be offset with respect to one another in a longitudinal direction.

FIG. 22A shows a perspective view of a connecting unit 15" according to a further exemplary embodiment of the invention with a band connector 330. The band connector 330 is composed of a tension band 331 which holds an at least partially ring-shaped clasp 332. The flexible cord element 20 shaped to form a loop projects with its terminating element (not visible in the figures) through a connector 220 with a single through-extending central opening for said terminating element. The band connector 330 in the form of the tension band 331 with an end loop receives an O-shaped or C-shaped clasp 332. In the exemplary embodiment illustrated, this is a C-shaped clasp 332, which enters into a form fit in corresponding lateral grooves of the connector 220 and pulls the flexible cord element 20 in the elongation thereof. For this purpose, lateral grooves 222 are provided in each case in the connector 220.

FIGS. 23A and 23B show a similar view to the exemplary embodiment as per FIG. 19B, wherein the connector 200 is illustrated on its own in FIG. 23A. It can be clearly seen from FIG. 23A that a relatively large central hole 202 as a second receptacle oriented to the band side is provided, said hole being adjoined by an inner shoulder which defines the relatively small opening that receives the through-extending band 30. Laterally with respect thereto to the left and to the right, there are situated the openings 203 as first receptacles which widen conically from the side visible in FIG. 23A. If not a connector 100 but rather a connector with a flange is provided, or with an upper or lateral rib, the opening 203 may also have a constant diameter throughout, or may at least partially provide a recess for the flange regions.

FIGS. 24A and 24B show, in greater detail, the exemplary embodiment of the connector 210 as per FIGS. 20 and 21. That which has been stated immediately above with regard to the openings 203 applies here, said openings in this case being provided as three openings 213 for the elastic elements 10. By contrast, the openings 212 are designed slightly differently to the openings 202 and, over the entire height, extend so as to narrow in terms of depth toward the passage opening as a slot for the corresponding band 30. Said openings however remain constant in width.

FIG. 25A shows a further, two-pail connector 230 according to an exemplary embodiment of the invention in a perspective view with inserted elastic element 10 in a closed configuration. FIG. 25B shows a perspective exploded view of the connector 230 from FIG. 25A. In the exemplary embodiment as per FIGS. 25A and 25B, the terminating element and connector have been combined to form a unit. This terminating element is integrated in the connector 230 in that, in a relatively large receiving space 233, there is provided a rib 234, which is directed toward the mouth and which is in this case a lower rib, and in that, onto the lower part 231 of the connector 230, there is fitted an upper part 232 which completely covers the top side of the lower part 231, and here, in the region of the projecting rib 234, a part which projects beyond the areal region of the upper part and which substantially closes the opening is equipped with a clamping rib 235. With a further form fit not illustrated in the drawing, a welded connection or screw connection, the upper part 232 is connected to the lower part and thus holds the bands 20 on the left-hand and on the right-hand side of the central opening 236. Here, the band 20 is already illustrated in the form predefined by the clamping.

FIGS. 26A and 26B show, in an open and a closed view respectively, a further exemplary embodiment similar to FIG. 25, in which the connector 240 is composed of its lower part 241 and an upper part 242. The rib 244 in the lower part 242 is situated opposite a correspondingly arranged complementary rib 245 in the upper body, between which ribs the inserted band part is clamped. Here, there is a form fit between upper part 242 and lower part 241 by means of the locking tabs 249 equipped with barbs. An opening provided in the rear side of the upper part 242 interacts with the rearwardly directed recess 246 provided in the lower part 241, and serves, as in the exemplary embodiment of FIG. 25, as a passage opening for the band loop 30. As in FIG. 25A, it is the case in FIG. 26A that the free end of the band 20 is, in the clamping effected as a result of the fitting of the upper part 242, illustrated in the form thus predefined.

FIG. 27A shows a front view of a further connector 250 according to an exemplary embodiment with a central opening 252 which transitions, in the rear part, into a conical slot 251. FIG. 27B shows a perspective view of the connector 250, FIG. 27C shows a front view of the connector 250 with two flexible cord elements 20, in part with terminating elements, and FIG. 27D shows a perspective view of the subject matter from FIG. 27C. For better visual legibility, the connecting element 200 at the upper ends of the cord portions 20 has not been illustrated in the illustration 27D. As shown in FIG. 18A, it is always the case that both ends of the cord strands 20 led parallel to and adjacent to one another are equipped with in each case one connector. The through-extending openings 253 for the terminating elements are in this case laterally open in order to enable an already prefabricated connecting unit 15, 15' etc. to be laterally inserted. It is then advantageously an exemplary embodiment of the terminating element with a flange from the exemplary embodiments with elements with the reference designations 137, 148, 1128, 1138, 1148, 1158, 1168 or 1178. The lateral openings 254 are preferably slots. The through-extending openings 253 are of square cross section.

Figure 28A:
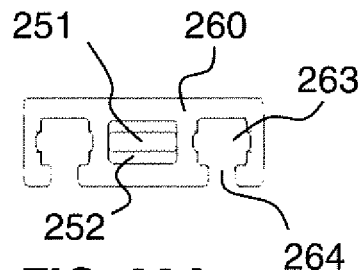
FIG. 28A shows a front view of a further connector according to an exemplary embodiment.
Figure 28C:
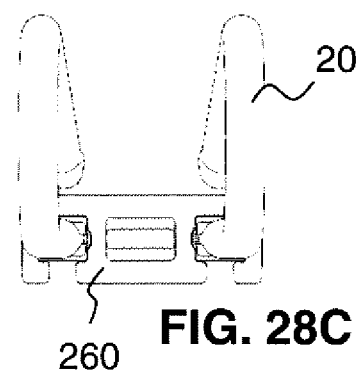
FIG. 28C shows a front view of the connector as per FIG. 28A with two flexible cord elements, in part with terminating elements.
Figure 28B:
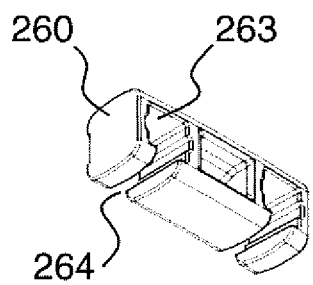
FIG. 28B shows a perspective view of the connector from FIG. 28A.
Figure 28D:
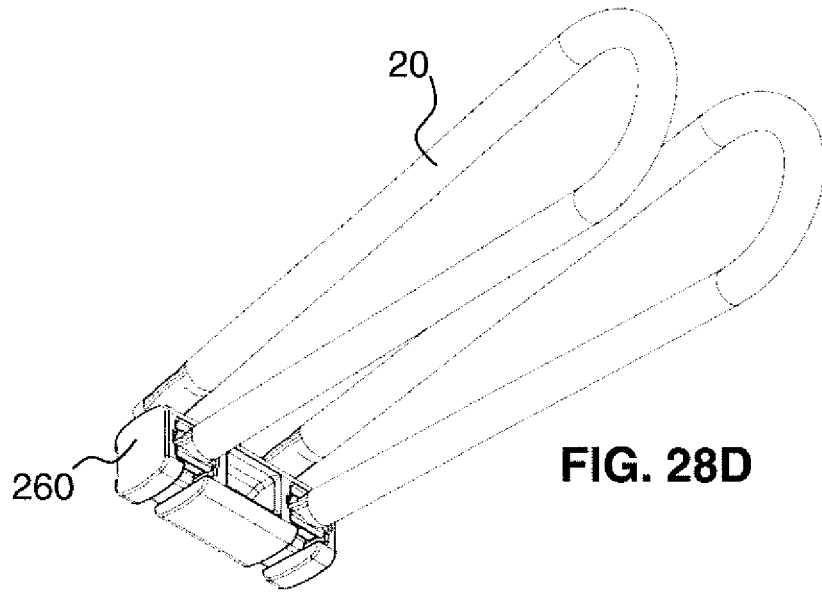
FIG. 28D shows a perspective view of the subject matter from FIG. 28C.
Figure 28E:
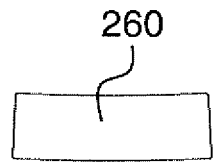
FIG. 28E shows a plan view of the connector as per FIG. 28A.
Figure 28F:
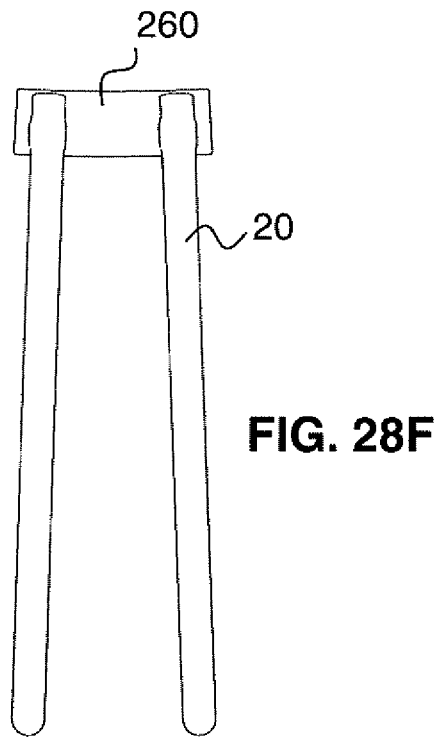
FIG. 28F shows a plan view of the subject matter from FIG. 28D.

FIG. 28A shows a front view of a further connector 260 according to an exemplary embodiment with a central opening 252 as before, which transitions in the rear part into a conical slot 251. FIG. 28B shows a perspective view of the connector 260, FIG. 27C shows a front view of the connector 260 with two flexible cord elements 20, in part with terminating elements, and FIG. 28D shows a perspective view of the subject matter from FIG. 28C. The through-extending openings 263 for the terminating elements are in this case downwardly open in order to enable an already prefabricated connecting unit 15, 15' etc. to be laterally inserted. It is then advantageously an exemplary embodiment of the terminating element with a flange from the exemplary embodiments with elements with the reference designations 137, 148, 1128, 1138, 1148, 1158, 1168 or 1178. The downwardly directed openings 264 are preferably longitudinal slots. The through-extending openings 263 are of square cross section. As in FIG. 27C and FIG. 27D, it is also the case in FIG. 28C and FIG. 28D that the second connector has not been illustrated. FIGS. 28E and 28F then show the connector 260 in each case in a plan view, from which it can be seen that the body of the connector 260 is designed to be slightly curved in the direction of the tension band to be inserted and of the flexible cord elements 20, so as to have a radius which substantially corresponds to the radius of the circle at the installation location of the connector 260 in relation to the central mat.

Figure 29A:
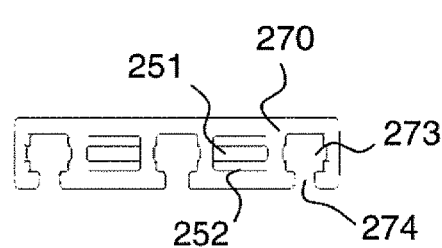
FIG. 29A shows a front view of a further connector according to an exemplary embodiment.
Figure 29B:
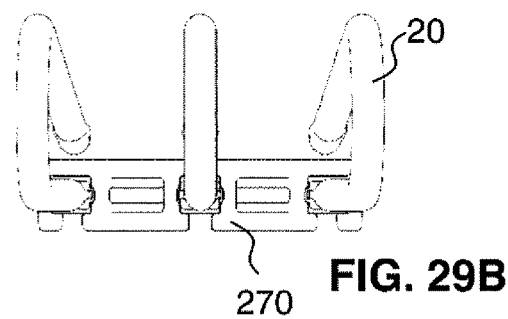
FIG. 29B shows a perspective view of the connector from FIG. 29A.
Figure 29C:
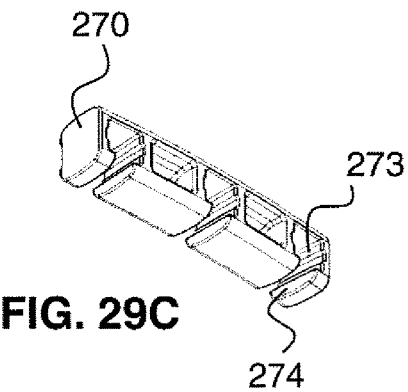
FIG. 29C shows a front view of the connector as per FIG. 29A with three flexible cord elements, in part with terminating elements.
Figure 29D:
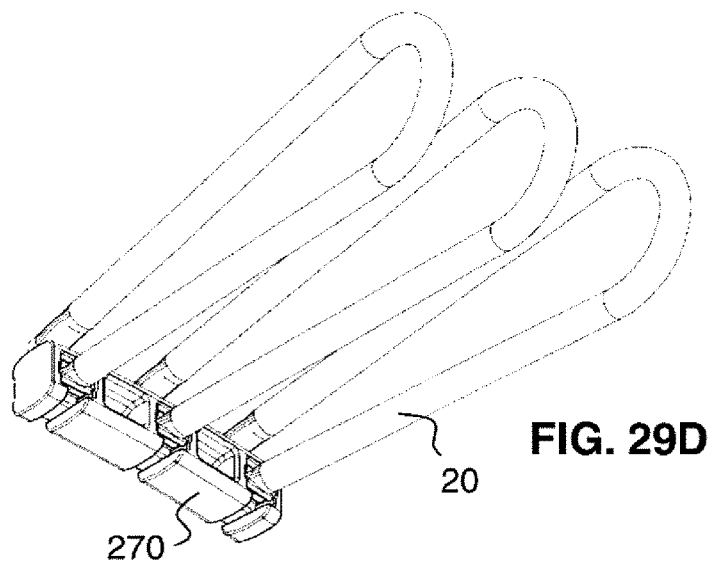
FIG. 29D shows a perspective view of the subject matter from FIG. 29C.
Figure 29E:
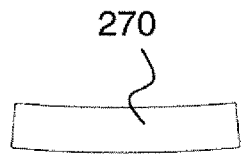
FIG. 29E shows a plan view of the connector as per FIG. 29A.
Figure 29F:
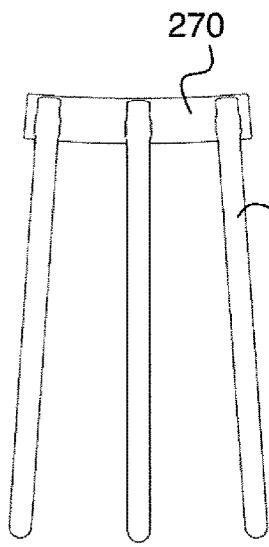
FIG. 29F shows a plan view of the subject matter from FIG. 29D.

FIG. 29A shows a front view of a further connector 270 according to an exemplary embodiment; FIG. 29B shows a perspective view; FIG. 29C shows a front view of the connector as per FIG. 29A with three flexible cord elements 20, in part with terminating elements; FIG. 29D shows a perspective view of the subject matter from FIG. 29C; and FIG. 29E and FIG. 29F show plan views of the subject matter from FIG. 29D. Rather than having two downwardly directed lateral openings 263 with a central opening 252 for the hand connector, as in FIG. 28A, there are in this case three downwardly directed openings 274, one of which is arranged centrally, such that two tension band receptacles 251, 253 are provided to the left and to the right of the central opening 274. Otherwise, the connector 270, which can be clearly seen as being curved from the plan views, corresponds very similarly to the exemplary embodiment from FIG. 28.

FIGS. 30 to 35 show a multiplicity of embodiments for the connection of the connecting band 30 to the connector 200. Here, in each case, the connector 200 with through-extending openings 203 is used as a possible exemplary embodiment. It is however clear that other connectors 200 may also be used. The embodiments show in each case a central connecting band 30 in the case of two flexible cord elements 20 to be arranged to the sides of the central connection. In the case of the three flexible cord elements 20 shown in the above other exemplary embodiments, it would then be necessary for three such openings 203 to be provided in the connector 200, and for the rear bands to be taken either individually or together and then connected to the trampoline.

FIG. 30A shows a front view of a connector 200 according to an exemplary embodiment with inserted tension band 30 and band connector 340. FIG. 30B shows a sectional side view of the connector 200, FIG. 30C shows a partial sectional plan view of the subject matter from FIG. 30A, and FIG. 30D shows a perspective view of the same. The band connector 340 is a cylinder whose length is dimensioned such that it can be pushed into the opening 252 without a great amount of play. The diameter of the cylinder is such that it is larger than the relatively small dimension of the slot 251, such that said cylinder, in particular when the tension band 30 has been wound around it, cannot slide through. Thus, when tension is exerted on the tension band 30, a pulling action is exerted on the cylinder, such that ultimately the tension band 30 lies against the slot 251 and is pressed against by the cylinder.

FIG. 31A, FIG. 31B, FIG. 31C, FIG. 31D and FIG. 31E show views of the same connector 200 as in FIG. 30 with a different band connector 350. This is likewise composed of a cylinder, which however transitions at the lateral ends into rectangular flange regions 351 which have dimensions such that they can be pushed into the opening 252 and lie against the slot 251. They protrude in the manner of a U-shaped bracket beyond the diverted loop and are placed with their cylinder side, which the two bracket flange regions 351 in the manner of a web, into the recess in the connector 200. Thus, the tensile force is transmitted directly from the tension band 30 of the band connector 350 via the flange regions 351 thereof to the wall of the slot 251 and thus to the body of the connector 200.

FIG. 32A, FIG. 32B, FIG. 32C and FIG. 32D show views of the same connector 200 as FIG. 30 with a different band connector 360. This is composed, in cross section, of a cylinder which forms a droplet shape and which has a cross section which narrows in the tension band direction. Here, the central opening of the connector 200 is adapted to this shape, which the upper and lower surface 361 converges in continuous fashion, so as to follow the droplet cross section, from the otherwise relatively large opening 252 to the slot 251, in order to hold the band connector 360 with a clamping fit, which subjects the tension band 30 to low load, on particular regions of the tension band 30. Thus, the tensile force is transmitted directly from the tension band 30 of the band connector 360 via the oppositely situated surfaces of band connector 360 and surfaces of the narrowing slot, and thus via relatively large surfaces.

FIG. 33A, FIG. 33B, FIG. 33C and FIG. 33D show views of a further connector 280 with a complementary band connector 370. This is composed of a C-shaped bracket which is supported on the surface, which has slight recesses for this, of the connector 280. Here, a cylinder 371, around which cylinder the tension band 30 is guided, is assigned and secured to the bracket laterally on the averted side in FIG. 33D. Thus, the tensile force is transmitted directly from the tension band 30 of the band connector 370 to the C-shaped bracket, and from there to the surfaces of the body of the connector 280.

FIG. 33E shows a side view of the band connector from FIG. 33A, FIG. 33F then shows a perspective view of the band connector, and FIG. 33G and FIG. 33H show perspective views of the band connector from FIG. 33E with an inserted band.

The top side and bottom side of the connector 280 may also, in the center, have slight recesses onto which the C-shaped bracket 370 can be fitted in an accurately positioned manner. In the center of the C opening, there is situated a cylinder 371. Said cylinder is connected, on one side, via a connecting web 372 to the rear side of the C-shaped bracket 370. During the mounting of the connector 280, the cylinder 371 is inserted into the loop eyelet of the tension band 370 until the latter abuts against the connecting web 372. The C-shaped bracket 370 with the integrated tension band 30 is subsequently pushed onto the connector 280 such that the C-shaped bracket engages into the recesses on the top side and bottom side of the connector 280. Thus, the tensile force is transmitted directly from the tension band 30 by the C-shaped band connector 370 to the body of the connector 280.

FIG. 34A shows a front view, and FIG. 34B shows a plan view, of the tension band 30 as per one of FIGS. 30 to 33, wherein FIG. 34C shows a perspective view of the tension band shaped to form a loop. In the above mentioned exemplary embodiments, a cylindrical body (in the sense of the mathematical definition of a cylinder) in each case is inserted into the loop opening 31, which body transmits the tensile force to the connector in each case directly, via flanges or via an outer holder.

FIG. 35A shows a front view, FIG. 35B shows a plan view, and FIG. 35C shows a perspective view, of a further tension band 30'. This has the same loop opening 31, and then the band, which is then present in a doubled-up configuration, transitions into a relatively wide section pointing away from the loop, so as to realize a larger securing area.

Figure 36A:
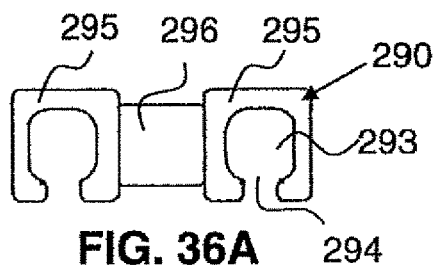
FIG. 36A shows a front view of a further connector according to an exemplary embodiment with inserted tension band.
Figure 36B:
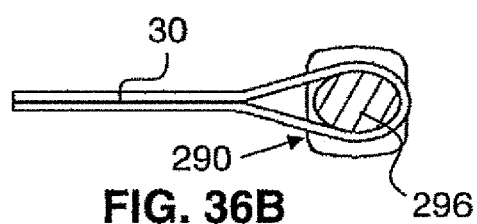
FIG. 36B shows a sectional side view of the connector with tension band from FIG. 36A.
Figure 36C:
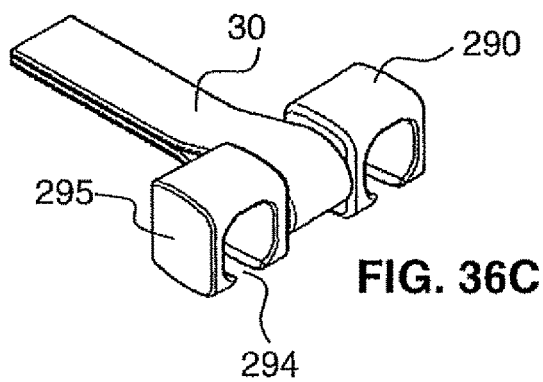
FIG. 36C shows a perspective view of the subject matter from FIG. 36A.

FIG. 36A shows a front view of a further connector 290 according to an exemplary embodiment with an inserted tension band 30. FIG. 36B shows a sectional side view of the connector 290, and FIG. 36C shows a perspective view of the subject matter from FIG. 36A. The connector 290 is of bone-shaped form and has, on the left and on the right, in each case one receiving body 295 for an elastic element 10 with a through-extending opening 293 and with a downwardly open slot 294 for the insertion of the elastic element 10. The two receiving bodies are connected by means of a connecting web 296 with a relatively small diameter, for example integrally as one injection-molded piece, such that lateral shoulders are formed. The band 30 is laid around the connecting web 296 which is of circular, elliptical or oval design in cross section.

Figure 37A:
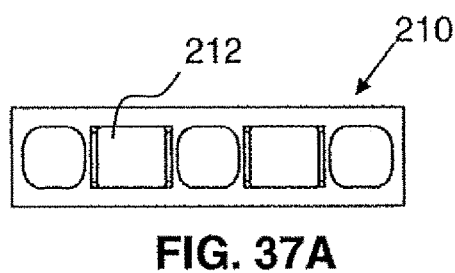
FIG. 37A shows a front view of a further connector according to an exemplary embodiment with inserted tension band.
Figure 37B:
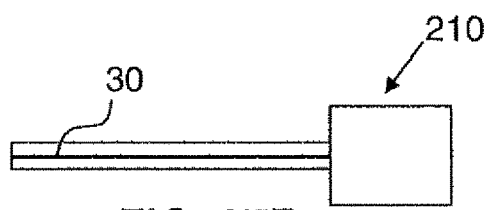
FIG. 37B shows a side view of the connector with tension band from FIG. 37A.
Figure 37C:
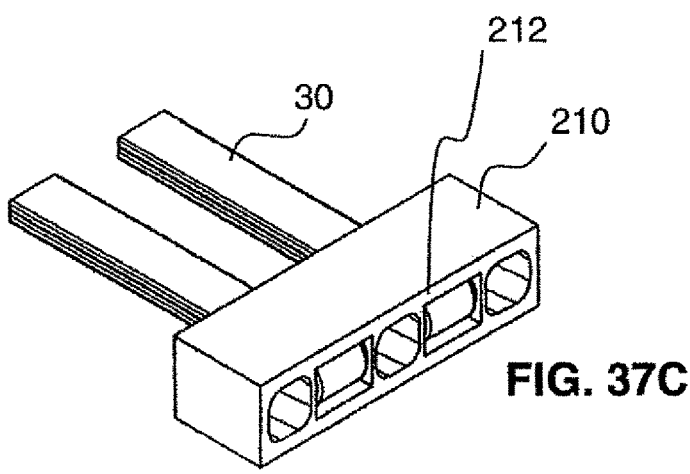
FIG. 37C shows a perspective view of the subject matter from FIG. 37A.

FIG. 37A shows a front view of the connector 210 according to the exemplary embodiment as per FIG. 20A with an inserted tension band 30 in the opening 212, wherein FIG. 37B shows a side view of the connector 210, and FIG. 37C shows a perspective view of the subject matter.

FIG. 38A shows a front view of a further band connector 1310 with an inserted tension band, and FIG. 38B shows a plan view of the subject matter from FIG. 38A. FIG. 38C and FIG. 38D show perspective views of the subject matter. The band connector 1310 comprises a retention cylinder 1371 around which the tension band 30 is laid. The retention cylinder 1371 projects out of the loop opening 31 to the right and to the left, and is held by two C-shaped portions 1372, which meet at their free ends centrally at the top and at the bottom in in each case one central clamping holding portion 1373, said portions being directed away from the tension band 30 and, by means of the inwardly curved free ends 1374, defining a holding space 1375 situated in between. The band connector 1310 is thus, overall, a C-shaped part between the two free ends 1374, wherein, centrally, the part bifurcates to as to extend laterally round the tension band 30 and hold the latter laterally on the cylinder 1371 to be inserted.

FIG. 39A shows a front view of the band connector 1310 with an inserted tension band 30 on a connector 200, and FIG. 39B shows a plan view of the subject matter from FIG. 39A. FIG. 39C and FIG. 39D show perspective views of the subject matter. It can be seen here that the clamping holding sections 1373, around a connecting web of relatively small diameter which is not illustrated in any more detail in the drawings and which is situated between the left-hand and right-hand receiving bodies, brace the tension band 30 relative to the connector 200.

FIG. 40A shows a front view of a further band connector 1320 with an inserted tension band 30 in relation to a connector for three elastic cord elements, and FIG. 40B shows a plan view of the subject matter from FIG. 40A. FIG. 40C and FIG. 40D show perspective views of the subject matter. Here, on the connector side, three elastic cord elements are provided, such that there are two lateral clamping holding portions 1373 which each have extensions of the C-shaped portions 1372. The retention cylinder 1371 projects out of the loop opening 31 to the right and the left and has a central section oriented parallel to the retention cylinder 1371. This central section is adjoined to the left and to the right, at the top and at the bottom, by two times two C-shaped portions 1372, which meet at their free ends centrally in in each case one central clamping holding portion 1373, which is directed away from the tension band 30 and by means of which the inwardly curved free ends 1374 define a holding space 1375 situated in between. The band connector 1320 thus has, on the left and on the right, a bracket section, between which the opening for the central of the three cord elements is provided. The band connector 1320 bifurcates in order for the tension band 30 to be arranged in an elongation of the central cord element. The cylinder 1381 is equipped here with a cover.

FIG. 41A shows a front view of a further connector 1210 with an inserted tension band 30, and FIG. 41B shows a plan view of the subject matter from FIG. 41A. FIG. 41C and FIG. 41D show perspective views of the subject matter. The body of the connector 1210 has, on the side facing toward the tension band 30, two projections 1376 with mutually aligned, transversely oriented openings for receiving the holding cylinder 1381 around which the tension band 30 is guided. The advantage of this solution lies in the relatively small space requirement in the width direction for a connector with three cord elements 20, because here, the tension band 30 is arranged in the direction of and behind the opening 203 for the central flexible cord element 20.

FIG. 42A shows a front view of a further connector 1220 with an inserted tension band 30, and FIG. 42B shows a plan view of the subject matter from FIG. 42A. FIG. 42C and FIG. 42D show perspective views of the subject matter. This connector 1220 is of similar design to the connector 1210 from FIG. 41, because it also a body with openings 203 situated relatively close together for the securing of an elastic element 10, wherein here, the cylinders 1391 are attached laterally, with a terminating element forming a shoulder, to oppositely situated transverse sides. Thus, on the other side, said connector 1220 directly necessitates the use of two tension bands 30.

FIG. 43A shows a front view of a further connector 1230 with an inserted tension band 30, and FIG. 43B shows a plan view of the subject matter from FIG. 43A. FIG. 43C and FIG. 43D show perspective views of the subject matter, and finally, FIG. 43E shows a sectional side view of the subject matter from FIG. 43A. The connector 1230 is composed of a lower part 1231 and upper part 1232, which are assembled in order, as in FIG. 25 and FIG. 26, for the flexible cord elements 20, to realize clamping by means of slots for in this case two cord elements 20. On the side of the tension band, a single lateral slot 1251 is provided in order, here, for the tension band 30 to be wound around the cylinder 1361 in advance, and for said unit to then be slid into the receptacle behind the slot 1251, such that, when the force acts in the tension direction of the tension band 30, the band is held in an effective manner in the region behind the cord elements.

FIG. 44A shows a perspective view of a partially illustrated connecting unit with a further connector 1200 according to an exemplary embodiment with an inserted tension band 30 and an inserted flexible cord element 20. FIG. 44B shows a side view of the connector 1200, FIG. 44C shows a sectional side view of the subject matter from FIG. 44A, and FIG. 44D shows a plan view of the subject matter from FIG. 44A. The connector 1200 itself can be seen in a perspective view in FIG. 45, and a bracket 400 is illustrated in a perspective view in FIG. 46. The connector 1200 is bone-shaped and has, on the left and on the right, in each case one receiving body 295 for an elastic element 10 with a through-extending opening 293 and with a laterally open slot 294 for the insertion of the elastic element 10. The two receiving bodies 295 are connected by means of a connecting web 296 of relatively small diameter, for example in one piece as an injection-molded part, such that lateral shoulders are formed. In the case of two connectors 1200 situated one above the other, a band 30 is placed into the intermediate region between two connecting webs 296, which band is then held by the bracket 400. The bracket 400 has two free legs 401, which clamp the connector 1200 with a clamping fit around the two outer side surfaces of the two connecting webs 296. Here, the band 30, after being led through the passage delimited by the inner side surfaces of the connecting webs 296, is pushed forward into a through-extending opening 402, and here, a cylinder 371 illustrated in cross section in FIG. 44C is assigned and secured to the bracket 400 laterally on the averted side in FIG. 46, around which cylinder the tension band 30 is guided. Thus, the tensile force is transmitted directly from the tension band 30 to the C-shaped bracket 400, and from there to the surfaces of the body of the connector 1200. Here, the connector 1200 is curved in order, in the arrangement, to correspond to the radius relative to the center of the jump mat.

The major advantage of the connector 400 as per FIG. 46 and in the use as per FIGS. 44 to 46 lies firstly in the small structural height, that is to say the small vertical spacing between the two free ends 401, because, in between, the two cord elements 20 bent to form a cord loop lie directly one on the other in the connectors 1200 and, by means of the recess 296, the structural height for the leadthrough of the band 30 is as small as possible. In particular, however, secondly, the structural length, that is to say the length in the direction of the band 30, is very small, because the loop around the cylinder 371 as blocking stein lies "behind" the connectors 1200, and thus the terminating elements of the cord elements lie behind the loop that runs around the cylinder 371. It is possible on each opposite side of the jump mat to realize a shortening of the attachment by one to two centimeters in relation to other exemplary embodiments, such that, with a frame of unchanged size, a larger jump mat can be used.

The cord hook module as per FIGS. 44 to 46 uses in particular terminating elements as per FIG. 7 on the cord portion ends. Use may alternatively also be made of terminating elements as per FIG. 9 or 10. During the assembly process, the two oppositely situated terminating elements of a cord portion are mounted into in each case one connector. The connectors are similar in terms of their basic form to the elements presented in FIG. 28, wherein they do not have the passage opening 252. The complete cord module is composed of two cord portions and two connectors. The preassembled module is connected with the aid of a holding element to the mat and to the trampoline frame. The holding element is connected by means of a band loop to the mat as illustrated in FIG. 32. During the assembly process, a first connector is inserted into the holding element. Subsequently, the cord strand pair with the second connector is guided around the frame tube. Subsequently, the second connector is inserted into that position of the holding element which still remains free.

FIG. 47A shows a perspective view of a partially illustrated further connecting unit with a further connector 1240 according to an exemplary embodiment with an inserted tension band 30 and an inserted flexible cord element 20. FIG. 47B shows a side view of the connector 1240, FIG. 47C shows a sectional side view of the subject matter from FIG. 47A, and FIG. 47D shows a plan view of the subject matter from FIG. 47A. The connector 1240 itself is shown in a perspective view in FIG. 48, and an associated bracket 400 is illustrated in a perspective view in FIG. 49. The connector 1240 is bone-shaped and has, on the left and on the right, in each case one receiving body 295 for an elastic element 10 with a through-extending opening 293 and with an upwardly open slot 294 for the insertion of the elastic element 10. The two receiving bodies 295 are connected by means of a connecting web 296 with a relatively small diameter, for example in one piece as an injection-molded part, such that lateral shoulders are formed. In the case of two connectors 1240 situated one above the other, a band 30 is placed into the intermediate region between two connecting webs 296, which band is then held by the bracket 400. The bracket 400 has two free legs 401, which clamp the connector 1240 with a clamping fit around the two outer side surfaces of the two connecting webs 296. Here, the band 30, after being led through the passage delimited by the inner side surfaces of the connecting webs 296, is pushed forward into a through-extending opening 402, and here, a cylinder 371 illustrated in cross section in FIG. 47C is assigned and secured to the bracket 400 laterally on the averted side in FIG. 49, around which cylinder the tension band 30 is guided. Thus, the tensile force is transmitted directly from the tension band 30 to the C-shaped bracket 400, and from there to the surfaces of the body of the connector 1240.

FIG. 50A shows a plan view of a connecting unit with two elastic elements 20 with in each case one terminating element 170 according to an exemplary embodiment of the invention integrated into the connecting unit. FIG. 50B shows a perspective view of the connecting unit as per FIG. 50A, FIG. 50C shows a partial side view of a detail of the connecting unit as per FIG. 50A. FIG. 51 is a perspective view of the integrated terminating element 170 of the connecting unit as per FIG. 50A. FIG. 52A shows a side view of partially illustrated connecting units as per FIG. 50A with an inserted band 30, FIG. 52B shows a sectional side view of the subject matter from FIG. 52A, and FIG. 52C shows a perspective view of the subject matter from FIG. 52A. Here, the terminating element 170 is a single-piece clamp with two lateral clamping regions 171. It is also possible for a U-shaped securing clamp to be provided for each cord element 20, as in the case of the terminating element 130. The clamping regions 171 transition into a rear wall 177, proceeding from which, substantially in the closed state, externally situated sides 179 extending parallel are formed. From these, to the free ends of the clamp 171, there extends clamping grooves 173 directed inward toward the cord element 20 to be inserted, which clamping grooves then in turn end at a free end 174 corresponding to a U. The elastic band 20 inserted in between can be clamped and deformed, wherein the free end 21 of the band 20 is prevented from being pulled back out of the receiving space when the clamp and terminating element is inserted into a bracket 400, as shown in FIGS. 52A to 52C. In this case, too, the band 30 is arranged between two connectors 170 arranged parallel to one another, which are terminating elements, is led through the opening 402 of the connector 400, and is prevented from sliding out by the cylinder 371 which is of droplet-shaped cross section and around which the band 30 is wound. The terminating element part 170, which is formed as a punched metal part, can easily hold two cord elements 20 arranged in parallel, in particular if the oppositely situated terminating element part 170 is folded over to form a loop for the cord elements 20, such that these two associated terminating element parts 170 are combined in one bracket 400.

In other words, in this configuration as per FIGS. 50 to 52, the two cord sections are connected at their ends by means of in each case one double terminating element. These bridge parts are simultaneously terminating element and connector. The elements used for this are punched and bent metal strip parts, in the case of which in each case one terminating element as per FIG. 7A or FIG. 9 or FIG. 10 forms the end zone of the metal profile. The holding element is connected by means of a band loop to the mat as discussed in conjunction with FIG. 32. During the assembly process, a first double terminating element/connector is inserted into the holding element. Subsequently, the cord strand pair with the second double terminating element/connector is guided around the frame tube. Subsequently, the second double terminating element/connector is inserted into that position of the holding element which still remains free.

FIG. 53A shows a perspective view of a partially illustrated further connector 1250 according to an exemplary embodiment, and FIG. 53B shows a perspective exploded view of three parts of the subject matter as per FIG. 53A. FIG. 54A shows a side view of a partially illustrated connecting unit as per FIG. 53A with an inserted band 30; FIG. 54B shows a sectional side view of the subject matter from FIG. 54A, and finally, FIG. 54C shows a plan view of the subject matter from FIG. 54A. The connector 1250 is designed similarly to the connector 1240, but is designed for receiving the terminating element part 1160. Here, too, it is again the case that the cord elements 20 with clamped-on terminating element 1160 are placed into the lateral openings of the connector 1250, wherein the opposite, other free ends of the cord elements with a corresponding further terminating element 1160 is inserted into the second, adjacent connector 1250. The two connectors are then held together by means of the connector 400, which is clamped in the shoulder region, and here, the band 30 leads through in the region between the two connectors 1250.

The figures show a variety of possibilities for realizing the band connection to a trampoline from its jump mat. They all assume a symmetrical application of force to the connecting part, which may be realized in different embodiments, which are each claimed in the context of the claims that now follow.

FIG. 55A shows a perspective view of a short multi-part connecting unit as connector 2200 with two mutually adjacently arranged flexible cord elements 20, which have been shaped to form a loop, and with a tension band 30", mounted into the connecting unit, similar to that in FIG. 35. The description relating to this and the following figures makes it clear in particular that a tension band 30'" with a looped mounting region 2010 and with a holding region 2020 relatively wide in relation thereto can be used in a variety of ways, and permits a shortening of the band length 30", in particular a shorter transition region with a wider holding region 2020. The widening region 2015 is provided between the region 2010 mounted in the connector 2200 and the holding region 2020. FIG. 55A shows a perspective view of the connector 2200 according to an exemplary embodiment with a central opening 2052, which in the rear part has lateral receptacles for a band connector 2030. The connector 2200 is in three parts, with an upper part 2210, a lower part 2220 and a clip 2230 which clamps and connects said parts 2210 and 2220 together. Here, the clip 2230 is arranged between the two flexible cord elements 20. FIG. 55B shows a perspective view of the connector 2200 with the two flexible cord elements 20, equipped in part with terminating elements 2100. For better visual legibility, the upper terminating element 2100 has not been illustrated in the case of the elastic element 10 illustrated on the left. By contrast, the two cord strands 20 led adjacent to one another and inserted in the lower part 2220 are equipped with in each case one connector 2100. Here, recesses 2330 in the lower part 2220 for receiving the connector 2100 with the clamped flexible cord element 20 can be seen.

A tension band 30' or 2030 for securing to a jump mat on a trampoline frame, in particular for use with a connector or with a connector unit, then has, according to the present invention, two free ends 2021, which are arranged so as to lie one on top of the other, and opposite these, a loop 31 is provided in a retention region 2010, wherein the loop 31 is connectable by means of a retention element 350, 360, 371 or 2030 to the connector or to a connector unit and thus indirectly to the trampoline frame, comprising a holding region 2020 at the free ends for securing, in particular sewing, to a jump mat. Here, the holding region 2020 is then wider, transversely with respect to the longitudinal extent of the tension band 30' or 2030, than the retention region 2010, which is provided in or on the connector, and between the holding region 2020 and retention region 2010, there is provided a transition region 2015 which adapts the width in the transverse dimension. Here, this is advantageously a monotonously widening portion, which may also be very short. It is advantageously of such a length that the widening angle at both sides amounts to no more than 30 degrees. The length of the holding region 2020 is predefined by the length of the piece to be sewn. It is advantageous for the retention region to widen directly after the connector, and for the transition region to end at the edge of the jump mat.

FIG. 56A shows a perspective view of a further terminating element 2110 according to an exemplary embodiment of the invention in the open state on a flexible cord element 20. The terminating element 2110 has a sleeve 2111 and a flange 2158 at a free end of the sleeve 2111. The flange corresponds functionally to the protruding ribs 1128 etc. It may also be used in the manner of the terminating element 2100. FIG. 56B shows a perspective view of the terminating element 2110 as per FIG. 56A in the closed state on and with a flexible cord element 20. Here, the sleeve 2111 is pinched and holds the flexible cord element 20 firmly as will be discussed in conjunction with FIG. 57. It is firstly also mentioned that the flange 2158 is open at the inside and has an opening 2112. The flange 2158 may however be of solid design as a plate, and thus close off the sleeve 2111 to form a blind hole, toward the inner end of which the flexible cord element 20 can be pushed forward. The flange 2158 may also be designed to be wider in the longitudinal direction of the sleeve 2111, wherein said flange can for example assume the form of the terminating element 2100.

FIG. 57 now shows a perspective view of a lower part 2220' of a longer connecting unit than that from FIG. 55B, with openings 2213 for the insertion of terminating elements of cord elements 20. The central opening 2052—similarly to the opening 202 etc.—is provided for receiving the narrow mounting region 2010, in order to anchor this (not illustrated) in the lower part, the upper part or the clip. The transition region 2015 may then directly adjoin the narrow mounting region 2010, in order for the tension band 30'" to be secured, in particular sewn, with a relatively wide holding region to the jump mat. It is thus possible for the width of the connectors 200, 210, . . . up to the 2200 etc. proposed here to be reduced, because the absorption of force at the band connectors 330 to 2030 is transmitted to the connector more easily than the tensile forces on the seams at the holding region 2020. The lateral openings 203 to 2213 can thus be arranged closer together.

The opening 2213 is designed as a blind hole, although this is not imperative. Here, in the depth of the opening, there is a cavity 2214, which correspondingly continues in the upper part which is not illustrated, said cavity being adjoined in the direction of the opening by a constriction 2215 in which the pinched sleeve 2111' comes to lie, whereas the flange 2158 remains in the cavity 2214. Thus, the terminating element 2110 is held firstly by the flange 2158, which cannot be pulled out through the constriction 2215, and secondly, the constriction 2215 prevents the sleeve 2111' from spreading apart again when a tensile force is exerted on the flexible cord element 20.

FIG. 58 shows a perspective view of a further connecting unit 2300 with an elastic element 10 shaped to form a loop with a flexible cord element 10 and terminating elements with laterally protruding ribs 1128 to 1178 and a tension band, mounted into the connecting unit, similar to that as per FIG. 35. Here, too, there is a lower part 2320 and a similar upper part 2310, which are held together by a clip 220. A total of four openings 2313 are provided in order for the two elastic elements 10 to be hooked in with the terminating elements at the free ends. In particular, it is to be noted that the width of the holding region 2020 of the tension band 30" is so wide that they protrude laterally over the inner sections of the openings 2313.

FIG. 59A shows a perspective view of a further connecting unit 2400 for one or two elastic elements shaped to form a closed loop and with an inserted tension band 30 similar to that as per FIG. 34. FIG. 59B then shows a perspective view of the tension band 30 as per FIG. 59A with a retention bar 2030, which is hooked into the connecting unit 2400. The holding region 2020' of this holding band 30 is no wider than the mounting region 2010. It is however possible here, too, for the holding region 2020' of this holding band 30 to be widened, like the holding band 30' in FIG. 35 or the holding bands 30" illustrated in FIGS. 55 and 58. Then, the holding region 2020' can extend beyond the lateral dimensions of the connecting unit 2400. The connecting unit 2400 has a rear body 2410 in relation to the arrangement of the mat in the direction of the holding band 30. Said body 2410 is bounded upwardly by a covering surface 2440 and downwardly by a tension band securing region 2430, such that a band lying on the rounded inner holding surface 2415, in particular a torus-shaped band, can lie on and can be connected to the outer region of a trampoline frame. Here, use is normally made of flexible cord elements 20, to which no terminating elements are secured at the free ends, it rather being the case that the two free ends are pinched together by means of a bracket. Then, it said end is advantageously disposed with the bracket on a central lug 2420, such that a displacement of the flexible cord elements 20 along their longitudinal orientation is no longer possible. The oppositely situated covering surface 2440 and tension band securing region 2430 also assist here. The latter may in particular rise upward in relation to the upper covering surface 2440, wherein, in the lower region, there are recesses for the insertion of the bar 2030 in order to fix the tension band in the inserted position. In the case of a short tension band, it is then substantially the transition region that absorbs the tensile forces and distributes them between holding region and mounting region. It is thus presented that the widened band 30" in all embodiments may also be used in the case of other types of elastic elements, in particular elastic elements in the form of a ring.

FIG. 60A shows a perspective view of a two-part terminating element 2120 according to an exemplary embodiment of the invention, and FIG. 60B shows a perspective view of one of the two identical terminating element parts 2121 as per FIG. 60A. The two terminating element parts 2121 are identical and have a lateral opening 2122 in a longitudinal direction and a complementary side wall 2123 with a hook 2124 which can be placed in engagement through the lateral opening 2122. The two side walls 2123 delimit a receiving space, formed by a bevel 2127, for the flexible cord element 20, which receiving space narrows to form a cavity 2126, characterized by two parallel walls, for a pinched region of the flexible cord element 20, which walls are held with a predetermined clamping spacing by the two hooks 2124. At the end of said cavity, a rounded edge 2128 is provided on the two free ends of the terminating element parts 2121, which edges point outward away from one another, in order that, during movements of the flexible cord element 20 on the terminating element 2120, said cord element is not damaged. The edges 2128 pointing away from one another also delimit a flat outer side 2129 of the terminating element part 2121 in the direction of the insertion of the cord element 20. It is thus possible for a holding element such as a rubber ring, a metal ring to be inserted around said two outer sides 2129, which holding element maintains the spacing of the cavity 216 under stress. An example of such a ring is in figure.

FIG. 61A shows a perspective view of a two-part terminating element 2130 as per a further exemplary embodiment of the invention, and FIG. 61B shows a perspective view of the lower terminating element part 2131 as per FIG. 61A with two oppositely situated clamping hooks 2124. Features identical to those in FIGS. 60A/B are denoted by the same reference designations. The side walls 2123 are in this case situated opposite one another on the lower part 2131, and the clamping hooks 2124 at the free ends of the side walls 2123 are directed toward one another and engage into oppositely situated recesses 2133 on the upper part 2132, whereby, as in FIGS. 60A/B, the horizontally oriented free ends securely clamp a flexible cord element 20, inserted in between, in the longitudinal direction of the flexible cord element 20.

FIG. 62A to FIG. 67B show terminating elements which are similar to the terminating elements 1110 to 1170 of FIG. 11A to FIG. 17C and which can be used similarly in connectors with a corresponding receptacle. FIG. 62A shows a perspective view of a further such terminating element 2510 in the closed state. Said terminating element 2510 has a sleeve 2511, which adjoins a frontal flange. In this respect, this embodiment is similar to that of FIG. 14A, with the proviso that there is a narrow, also sleeve-shaped flange opposite the sleeve 2511, which flange can engage into corresponding recesses of a connector in order to prevent the flexible cord element from being pulled back. FIG. 62B shows a perspective view of the terminating element 2510 as per FIG. 62A in the closed state on and with a flexible cord element 20.

FIG. 63A shows a perspective view of a further terminating element 2520 in the closed state with regions protruding laterally further in relation to the embodiment of FIGS. 62A/B; FIG. 63B shows a perspective view of the terminating element 2520 as per FIG. 63A in the closed state on and with a flexible cord element 20; otherwise, it is also the case here that a sleeve 2521 which is relatively thin in outer diameter is attached to a flange 2522 with a larger outer diameter than but the same inner diameter as the sleeve 2521, which deform as a result of pinching from a hollow cylindrical shape to the shape as per FIG. 63A and FIG. 63B.

FIG. 64A shows a perspective view of the terminating element 2530 as per FIG. 63A in the open state; FIG. 64B shows a perspective view of the terminating element 2530 as per figure MA in the open state on and with a flexible cord element. Here, the terminating element 2530 has a cylindrical sleeve 2531 and a corresponding flange 2532 adjoining said sleeve, which can be pushed loosely onto the flexible cord element 20. After pinching from opposite sides, the cross-sectional opening becomes an oval with more or less pronounced laterally protruding edges, which furthermore, with the flange region, ensure security against a pulling action on the terminating element 2530.

FIG. 65A shows a perspective view of a further terminating element 2540 similar to the terminating element 2510 as per FIGS. 62A/B with an interrupted flange 2542 in the closed state; FIG. 65B shows a perspective view of the terminating element 2540 as per FIG. 65A in the closed state on and with a flexible cord element 20. Here, two oppositely situated interruptions 2543 are situated in the flange 2542 at the flattened points of the sleeve 2541.

FIG. 66A shows a perspective view of a further terminating element 2550 similar to the terminating element 2520 as per FIGS. 63A/B with an interrupted flange 2552 in the closed state, with regions protruding laterally in relation to the embodiment as per FIGS. 65A/B. Here, two oppositely situated interruptions 2553 are situated in the flange 2552 at the flattened points of the sleeve 2551. FIG. 66B shows a perspective view of the terminating element 2550 as per FIG. 66A in the closed state on and with a flexible cord element 20.

FIG. 67A shows a perspective view of the terminating element 2560 as per FIG. 66A in the open state; and FIG. 67B shows a perspective view of the terminating element 2560 as per FIG. 67A in the open state on and with a flexible cord element 20. Here, the terminating element 2560 has a cylindrical sleeve 2561 and, adjoining the latter, a corresponding flange 2562, which can be pushed loosely onto the flexible cord element 20. After pinching from opposite sides, applied to the side of the oppositely situated apertures 2563 in the flange 2560, the cross-sectional opening becomes an oval with more or less pronounced laterally protruding edges, which furthermore, together with the flange region, ensure security against a pulling action on the terminating element 2560.

FIG. 68A shows a perspective view of a further two-part terminating element 2570 with an additional metal ring 2574 with fixing action, and FIG. 68B shows a perspective view of the lower terminating element part 2571 as per FIG. 68A with the metal ring 2574. The two terminating element parts 2571 are identical. The two opposite sides 2573 together with a bevel 2577 delimit formed receiving space for the flexible cord element 20, which narrows to form a cavity 2576, characterized by the two parallel walls 2571, for a pinched region of the flexible cord element 20. Here, the cavity 2576 is maintained with a predefined clamping spacing by the metal ring 2574. Here, the metal ring 2574 is held in the longitudinal direction of the flexible cord element by the rounded edge 2578 provided on the two free ends of the terminating element parts 2571, which edges point outward away from one another, also in order that, during movements of the flexible cord element 20 on the terminating element 2570, said cord element is not damaged. The metal ring 2574 is, in cross section, that is to say in the longitudinal direction of the cord element 20 to be inserted, of substantially square or possibly rectangular form, that is to say has four substantially planar surfaces and four rounded corners, wherein, at one side, in this case opposite the rear side of one terminating element part 2571, there is provided a slot 2572, such that the metal ring 2574 can be laid with a prestress around the two terminating element parts 2571. The side parts of the metal ring 2574 may also be curved, the side parts, which on the surface FIG. 69A shows a perspective view of a lower part 2620 of a further connecting unit with an elastic element 20 shaped to form a loop and with a terminating element 2610, inserted laterally into the connecting unit, of the elastic element 20 with hoop fastener. In this regard, FIG. 69B shows a perspective view obliquely from the rear and from below of the connecting unit as per FIG. 69A without an inserted terminating element 2610. The central opening 2652—similarly to the opening 202 etc.—is provided for receiving the narrow mounting region 2010 in order to anchor the latter (not illustrated) in the lower part, the upper part or the clip. The narrow mounting region 2010 may then be directly adjoined by the transition region 2015, in order for the tension band 30' to be secured, in particular sewn, with a relatively wide holding region to the jump mat. The lateral opening 2654 is designed as a blind hole, although this is not imperative. Here, in the opening, there is a cavity 2614 which is remote from the cord element and which is adjoined in the direction of the cord element by a constriction 2615, in which the pinched sleeve 2611' comes to lie, whereas the flange 2658 remains in the cavity 2614. The terminating element 2610 also has, on the opposite side, a further flange 2658, which comes to lie in the opening close to the cord element. Thus, the terminating element 2610 is held firstly by the front flange 2658, which cannot be pulled out through the constriction 2615, and secondly, the constriction 2615 prevents the sleeve 2611' from spreading apart again when a tensile force is exerted on the flexible cord element 20. The constriction 2615 is composed of two oppositely situated walls, which form lugs 2651 at their outer free ends. Here, the free ends of a C-shaped hoop 2655 are inserted into two lateral bores in a lug 2651, which hoop can, during the closure, engage with detent action over the other lug 2651 into a detent depression 2653 provided there. Thus, the terminating element 2610 is also secured against sliding out laterally.

FIG. 70A shows a perspective view of a further two-part terminating element 2710 composed of two metal parts 2711 and 2712. This terminating element 2710 comprises an outer, encompassing outer clamping body 2711, which in plan view has the shape of a U with flattened lower and lateral walls, wherein the free ends 2713 are bent back toward themselves, such that, in turn, small U shapes are formed. Between these, the free ends 2714 of the inner clamping body 2712 come to lie, which thus likewise has the appearance of a U in the front view. Thus, between the two plates 2715 of the metal parts 2711 and 2712, there is formed a cavity 2716 for receiving the flexible cord element 20, wherein this is then compressed and thus clamped in said cavity 2716.

FIG. 70B shows a perspective view of a further two-part terminating element 2720 composed of a metal part 2721 and a central, in particular plastics part 2722, which is a solid material part and forms an inner clamping body, which is inserted with a form fit between the indentations 2723. Here, between the base plate 2725 of the metal part 2721 and the bottom side 2727 of the plastics part 2722, there is formed a cavity 2726 for receiving the flexible cord element 20, wherein the latter is then compressed and thus clamped in said cavity 2726.

FIG. 70C shows a perspective view of a further two-part terminating element 2730 composed of a metal part 2731 and a central plastics part 2732 with a flange 2738. The plastics part 2732 is a solid material part and forms the inner clamping body, which is inserted with a form fit between the indentations 2723 as in FIG. 70B. Here, between the base plate 2725 of the metal part 2731 and the bottom side 2727 of the plastics part 2732, there is formed a cavity 2726 for receiving the flexible cord element 20, wherein the latter is then compressed and thus clamped in said cavity 2726.

LIST OF REFERENCE DESIGNATIONS

| | |
|---|---|
| 10 | Elastic element |
| 11 | Free end |
| 15, 15', 15" | Connecting unit |
| 20 | Flexible cord element |
| 21, 22 | Free end |
| 30, 30', 30''' | Tension band |
| 31 | Loop opening |
| 100, 110, 120, 130, 140, 150, 160, 170, 2100, 2110, 2120, 2130 | Terminating element |
| 101 | Clamping body |
| 102 | Internally situated clamping surface |
| 103, 123, 133 | Receiving space |
| 107, 127, 137, 147, 157, 167, 177 | Rear wall |
| 108, 128 | Front side |
| 109, 139, 149 | Externally situated side |
| 112 | Toothed clamping surface |
| 121 | Clamping surface |
| 121' | Complementary clamping groove |
| 131, 141, 151, 161, 171 | Clamp |
| 132, 142, 152 | Bracket |
| 133, 143, 153, 163, 173 | Clamping groove directed toward the band |
| 134, 144, 154, 164, 174 | U-shaped free end |
| 135, 145, 155, 165 | Free end to be bent toward one another |
| | Rear wall |
| 148 | Protruding flange |

-continued

| | |
|---|---|
| 162 | Bracket lug |
| 200, 210, 220, 230, 240, 250, 260, 270, 280, 290, 1210, 1220, 1230, 1240, 1250, 2200, 2300, 2400 | Connector/connecting element |
| 201, 202, 211, 212, 251, 252, 1251, 2052, 2652 | Opening |
| 203, 213, 253, 263, 273, 293, 2213, 2313 | Opening |
| 222 | Lateral groove |
| 231, 241, 1231 | Lower part |
| 232, 242, 1232 | Upper part |
| 233, 2330 | Receiving space |
| 234, 244 | Projecting rib |
| 235, 245 | Clamping rib |
| 236, 246 | Opening |
| 249 | Locking tab |
| 254, 264, 274, 294, 2654 | Lateral/lower opening |
| 295 | Receiving body |
| 296 | Connecting web |
| 330, 340, 350, 360, 370, 1310, 1320, 2030 | Band connector |
| 331 | Tension band |
| 332 | Clasp |
| 351 | Lateral flange |
| 361 | Slot surface |
| 371, 1371, 1381, 1391 | Cylinder |
| 372 | Connecting web |
| 400 | Bracket |
| 1110, 1120, 1130, 1140, 1150, 1160, 1170, 2510, 2520, 2530, 2540, 2550, 2560, 2570, 2610, 2710, 2720, 2730 | Terminating element |
| 1111, 1121, 1131 | Inner clamping body |
| 1128, 1148, 1158, 1168, 1178 | Protruding rib |
| 1139 | Arcuate extension |
| 1149, 1169, 1179 | Rear-side top side |
| 1171 | Clamping side body |
| 1177 | Side wall |
| 1372 | C-shaped portion |
| 1373 | Clamping holding portion |
| 1374 | Free end |
| 1375 | Holding space |
| 1376 | Projection |
| 2010 | Mounting region |
| 2015 | Widening region/transition region |
| 2020, 2020' | Holding region |
| 2021 | Free end |
| 2111 | Sleeve |
| 2111', 2611' | Pinched sleeve |
| 2112 | Inner opening |
| 2121, 2131, 2571 | Lower part |
| 2122 | Lateral opening |
| 2123 | Side wall |
| 2124 | Hook |
| 2126, 2576 | Cavity |
| 2127, 2577 | Bevel |
| 2128, 2578 | Rounded edge |
| 2129, 2579 | Outer side |
| 2132 | Upper part |
| 2133 | Recess |
| 2158, 2658 | Flange |
| 2210, 2310 | Upper part |
| 2215, 2615 | Constriction |
| 2220, 2220', 2320, 2620 | Lower part |
| 2230 | Clip |
| 2410 | Body |
| 2415 | Rounded holding surface |
| 2420 | Central holding lug |
| 2430 | Tension band securing region |
| 2440 | Covering surface |
| 2511, 2521, 2531, 2541, 2551, 2561 | Sleeve |
| 2512, 2522, 2532, 2542, 2552, 2562 | Flange |
| 2543, 2553, 2563 | Flange interruption |
| 2572 | Slot in the metal ring |
| 2573 | Inner side |
| 2574 | Metal ring |
| 2651 | Lug |
| 2653 | Detent depression |
| 2655 | Hoop |
| 2711, 2712, 2721 | Metal part |
| 2713 | Free end |
| 2715, 2725 | Base plate |
| 2716 | Cavity |
| 2722, 2732 | Plastics part |
| 2723 | Indentation |
| 2727 | Bottom side |
| 2738 | Flange |

The invention claimed is:

1. A method for securing a jump mat to a trampoline frame, having the steps:
   a) providing a multiplicity of elastic elements each elastic element having free ends,
   b) providing a multiplicity of connectors each having a first receptacle and a second receptacle,
   c) looping a cord loop formed from the at least one elastic element around a portion of the trampoline frame,
   d) mounting the free ends of the elastic elements into the first receptacle of the respective connector,
   e) mounting at least one tension band, which has a loop, into the second receptacle of the respective connector connected to the free ends of the elastic elements,
   f) repeating steps c) to e) for all provided elastic elements along the circumference of the trampoline frame,
   wherein mounting the tension band into the respective connector is subdivided into three steps:
      f1) passing the loop of the tension band through the second receptacle of the connector, wherein the second receptacle has a larger opening on the side facing outwards to the elastic elements than on the side facing inwards to the tension band,
      f2) inserting a retaining element into the loop of the tension band projecting through the second receptacle, and
      f3 pulling back the loop with the retaining element inserted in it until the position of the loop of the tension band is locked within the opening of the second receptacle of the connector.

2. The method as claimed in claim 1, wherein steps d) and e) are performed in each case in the reverse sequence.

* * * * *